(12) United States Patent
Kundel

(10) Patent No.: US 7,400,069 B2
(45) Date of Patent: *Jul. 15, 2008

(54) GENERATOR HAVING RECIPROCATING AND ROTATING PERMANENT MOTOR MAGNETS

(76) Inventor: Stephen Kundel, 988 Henn Hyde Rd., Warren, OH (US) 44484

( * ) Notice: Subject to any disclaimer, the term of this patent is extended or adjusted under 35 U.S.C. 154(b) by 213 days.

This patent is subject to a terminal disclaimer.

(21) Appl. No.: 11/335,458

(22) Filed: Jan. 19, 2006

(65) Prior Publication Data
US 2006/0244327 A1    Nov. 2, 2006

Related U.S. Application Data

(63) Continuation-in-part of application No. 11/116,006, filed on Apr. 27, 2005, now Pat. No. 7,151,332.

(51) Int. Cl.
*H02K 33/00* (2006.01)
*H02K 35/00* (2006.01)
*H02K 7/06* (2006.01)

(52) U.S. Cl. .............................. 310/20; 310/80; 310/15; 310/268

(58) Field of Classification Search ................. 310/113, 310/15, 268, 20, 21, 36, 37, 80, 103
See application file for complete search history.

(56) References Cited

U.S. PATENT DOCUMENTS

| | | |
|---|---|---|
| 561,144 A | 6/1896 | Trudeau |
| 1,724,446 A | 8/1929 | Worthington |
| 2,790,095 A * | 4/1957 | Peek et al. .................... 310/103 |
| 2,943,216 A * | 6/1960 | Spodig ......................... 310/103 |
| 3,469,130 A | 9/1969 | Jines et al. |
| 3,703,653 A | 11/1972 | Tracy |
| 3,811,058 A | 5/1974 | Kiniski |
| 3,879,622 A | 4/1975 | Ecklin |
| 3,890,548 A | 6/1975 | Gray |
| 3,899,703 A | 8/1975 | Kinnison |

(Continued)

FOREIGN PATENT DOCUMENTS

DE    19850314 A1    5/2000

(Continued)

*Primary Examiner*—Karl I Tamai
(74) *Attorney, Agent, or Firm*—Robert J. Herberger, Esq.

(57) ABSTRACT

A generator for producing electric power includes a drive mechanism, such as a drive motor, having a rotor supported for rotation about an axis. A first generator magnet driveable by the rotor includes a reference pole facing in a first direction. A second generator magnet driveable by the rotor includes a pole of opposite polarity from the reference pole located near the reference pole and facing in the first direction. The first and second generator magnets produce a magnetic field whose flux extends between the reference pole of the first generator magnet and opposite pole of the second generator magnet. A stator includes an electrical conductor winding located adjacent the first and second magnets such that the magnetic field repetitively intersects the winding as the rotor driveably rotates. The drive motor for operating the generator includes a pair of first and second rotor magnets spaced angularly about the axis and supported on the rotor, a reciprocating magnet, and an actuator for moving the first reciprocating magnet cyclically toward and away from the first pair of the rotor magnets, for cyclically rotating the first pair of rotor magnets relative to the reciprocating magnet.

15 Claims, 17 Drawing Sheets

U.S. PATENT DOCUMENTS

| | | | |
|---|---|---|---|
| 3,931,535 A * | 1/1976 | Roesel, Jr. | 310/113 |
| 3,967,146 A | 6/1976 | Howard | |
| 3,992,132 A | 11/1976 | Putt | |
| 4,011,477 A | 3/1977 | Scholin | |
| 4,151,431 A | 4/1979 | Johnson | |
| 4,179,633 A | 12/1979 | Kelly | |
| 4,196,365 A * | 4/1980 | Presley | 310/23 |
| 4,267,647 A | 5/1981 | Anderson et al. | |
| 4,629,921 A | 12/1986 | Gavaletz | |
| 4,751,486 A | 6/1988 | Minato | |
| 5,402,021 A | 3/1995 | Johnson | |
| 5,594,289 A | 1/1997 | Minato | |
| 5,634,390 A | 6/1997 | Takeuchi et al. | |
| 5,689,994 A * | 11/1997 | Nagai et al. | 74/89.32 |
| 5,751,836 A | 5/1998 | Tamura et al. | |
| 5,925,958 A | 7/1999 | Pirc | |
| 6,069,420 A * | 5/2000 | Mizzi et al. | 310/40 MM |
| 6,169,343 B1 | 1/2001 | Rich, Sr. | |
| 6,343,419 B1 | 2/2002 | Litman et al. | |
| 6,841,909 B2 | 1/2005 | Six | |
| 2002/0167236 A1 | 11/2002 | Long | |
| 2004/0410722 | 7/2004 | Long | |
| 2006/0244327 A1* | 11/2006 | Kundel | 310/113 |

FOREIGN PATENT DOCUMENTS

WO    WO 02101908 A1    12/2002

* cited by examiner

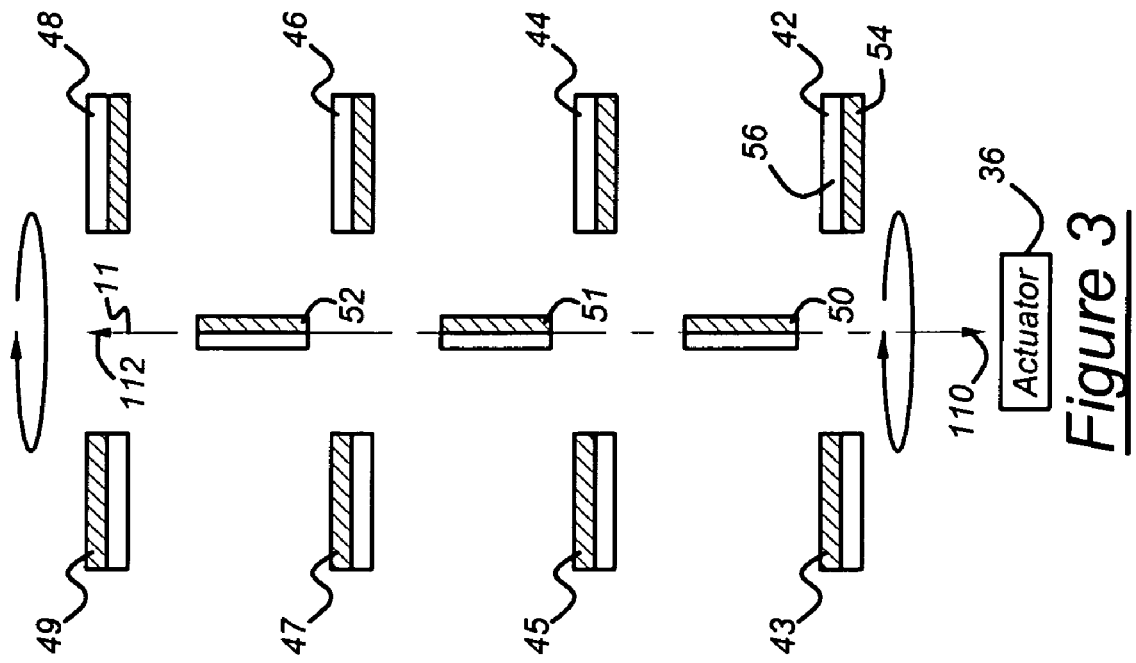
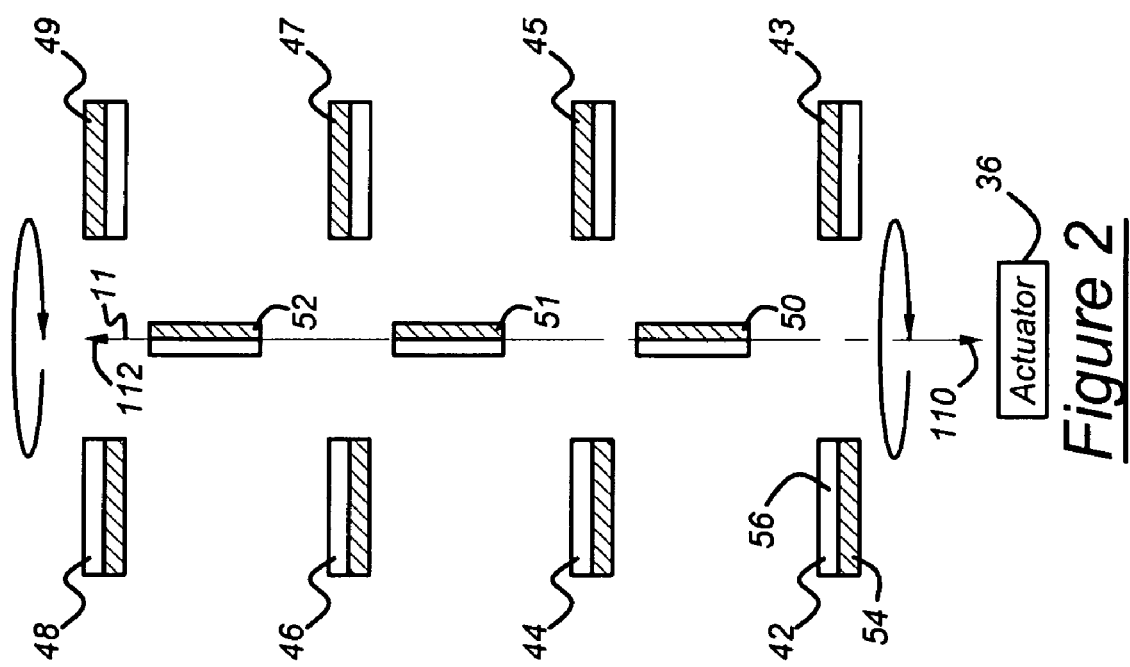

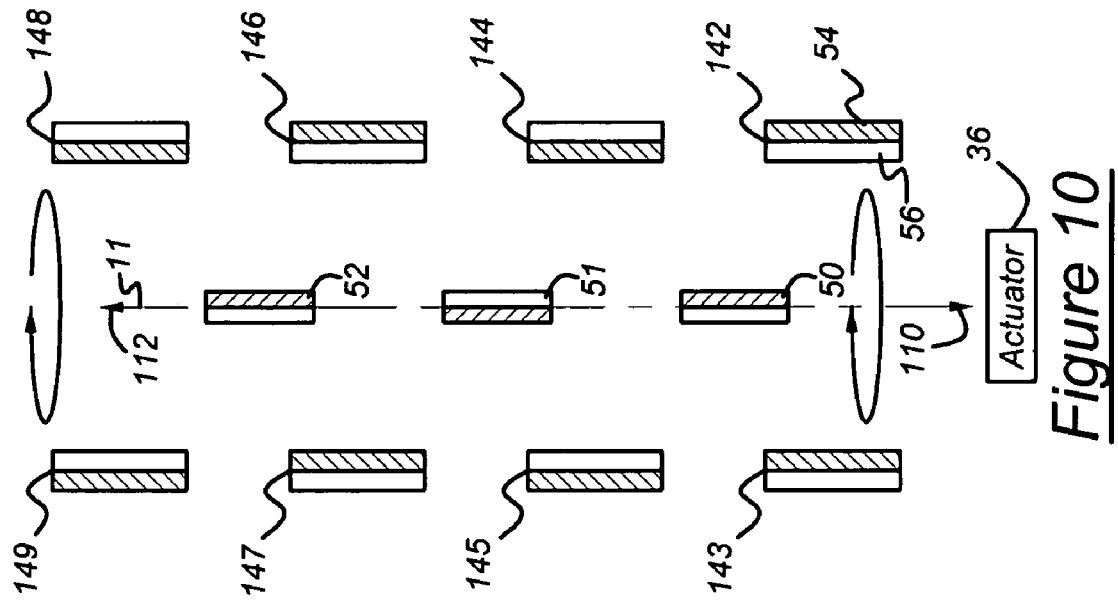
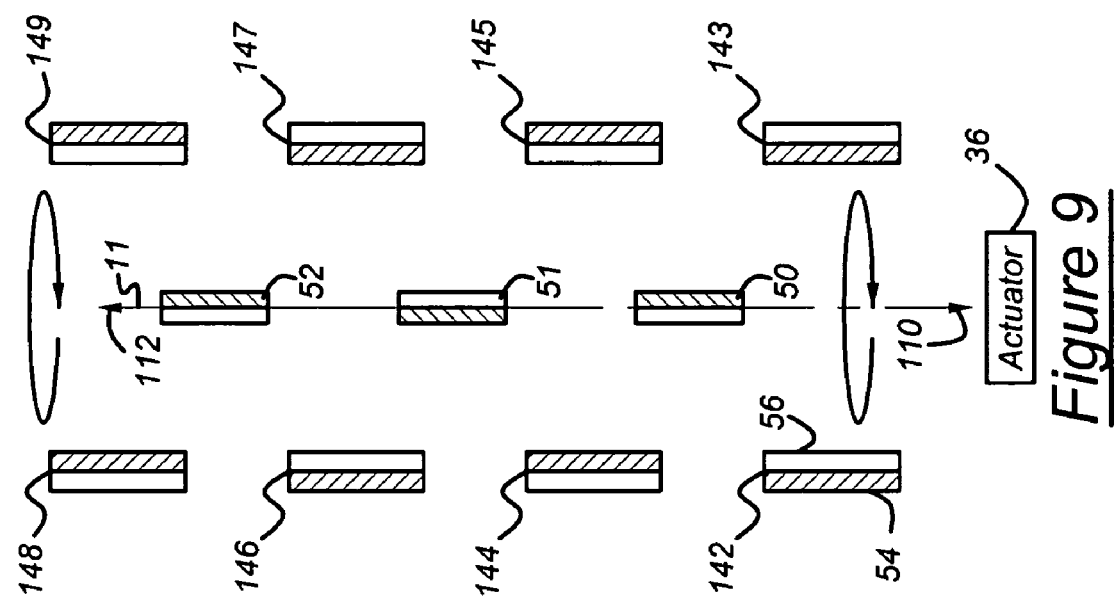

GENERATOR HAVING RECIPROCATING AND ROTATING PERMANENT MOTOR MAGNETS

CROSS-REFERENCE TO RELATED APPLICATION

This application is a continuation-in-part of the co-pending parent, U.S. patent application Ser. No. 11/116,006, filed Apr. 27, 2005, now issued as U.S. Pat No. 7,151,332, and is related to co-pending U.S. patent application Ser. No. 11/479,612, filed Jun. 30, 2006, which is a divisional application of the identified parent.

BACKGROUND OF THE INVENTION

This invention relates to the field of electric power generators. More particularly, it pertains to a generator whose rotor is rotationally driven by a drive motor having mutual attraction and repulsion of permanent magnets. Rotation can be sustained through operation of a low power oscillator. The generator creates electric current by passing multiple magnetic fields produced by an arrangement of permanent generator magnets across windings mounted on a stator as the rotor rotates.

Various kinds of motors are used to drive a load. For example, hydraulic and pneumatic motors use the flow of pressurized liquid and gas, respectively, to drive a rotor connected to a load. Such drive motors must be continually supplied with pressurized fluid from a pump driven by energy converted to rotating power by a prime mover, such as an internal combustion engine. The several energy conversion processes, flow losses and pumping losses decrease the operating efficiency of motor systems of this type.

Conventional electric motors employ the force applied to a current carrying conductor placed in a magnetic field. In a d.c. motor the magnetic field is provided either by permanent magnets or by field coils wrapped around clearly defined field poles on a stator. The conductors on which the force is developed are located on a rotor and supplied with electric current. The force induced in the coil is used to apply rotor torque, whose magnitude varies with the magnitude of the current and strength of the magnetic field. However, flux leakage, air gaps, temperature effects, and the counter-electromotive force reduce the efficiency of the motor.

Permanent dipole magnets have a magnetic north pole, a magnetic south pole, and magnetic fields surrounding each pole. Each magnetic pole attracts a pole of opposite magnetic polarity. Two magnetic poles of the same polarity repel each other. It is desired that a drive motor is connected to a generator such that the motor's rotor is driven by the mutual attraction and repulsion of the poles of permanent magnets and the rotor of the motor drives the generator.

SUMMARY OF THE INVENTION

A generator for producing electric power includes a driving mechanism, such as a drive motor, having a rotor supported for rotation about an axis. A first generator magnet driveable by the rotor includes a reference pole facing in a first direction. A second generator magnet driveable by the rotor includes a pole of opposite polarity from the reference pole located near the reference pole and facing in the first direction. The first and second generator magnets produce a magnetic field whose flux extends between the reference pole of the first generator magnet and opposite pole of the second generator magnet. A stator includes an electrical conductor winding located adjacent the first and second generator magnets such that the magnetic field repetitively intersects the winding as the rotor driveably rotates. The drive motor for driving the generator includes a pair of first and second rotor magnets spaced angularly about the axis and supported on the rotor, a reciprocating magnet, and an actuator for moving the reciprocating magnet cyclically toward and away from the first pair of rotor magnets, for cyclically rotating the first pair of rotor magnets relative to the reciprocating magnet.

Preferably, rotation of the generator magnets is sustained through operation of an oscillator, which requires a relatively low magnitude of electric power. The generator produces electric current by passing multiple magnetic fields produced by the arrangement of the permanent first and second generator magnets across windings mounted on the stator as the rotor rotates.

The drive motor can be easily started by manually rotating the rotor about its axis. Rotation continues by using the actuator to move the reciprocating magnet toward the first rotor magnet pair and away from the second rotor magnet pair when rotor rotation brings the reference pole of the first rotor magnet closer to the opposite pole of the reciprocating magnet, and the opposite pole of the second rotor magnet closer to the reference pole of the reciprocating magnet. Then the actuator moves the reciprocating magnet toward the second rotor magnet pair and away from the first rotor magnet pair when rotor rotation brings the reference pole of the third rotor magnet closer to the opposite pole of the reciprocating magnet, and the opposite pole of the fourth rotor magnet closer to the reference pole of the reciprocating magnet.

The generator according to this invention requires no power source to energize a field coil because the magnetic fields of the rotor magnets, generator magnets and reciprocating magnets are permanent magnets. A nine-volt d.c. battery has been applied to an actuator switching mechanism to alternate the polarity of a solenoid at the rotor frequency. The solenoid is suspended over a permanent magnet of the actuator mechanism such that rotor rotation and the alternating polarity of a solenoid causes the actuator to oscillate the reciprocating magnet at a frequency and phase relation that is most efficient relative to the rotor rotation.

The generator is lightweight and portable, and requires only a commercially available portable d.c. battery to power the actuator for the oscillator. No motor drive electronics is required. Further, operation of the generator is practically silent.

Various other objects and advantages of this invention will become apparent to those skilled in the art.

BRIEF DESCRIPTION OF THE DRAWINGS

As stated, these and other advantages of the present invention will become apparent to those skilled in the art, particularly from the following detailed description of a preferred embodiment when considered in the light of the accompanying drawings in which:

FIG. 2 is a top view of the drive motor of FIGS. 1A and 1B showing the rotor magnets disposed horizontally and the reciprocating magnets located near one end of their range of travel;

FIG. 3 is a top view of the drive motor of FIG. 2 showing the rotor magnets rotated one-half revolution from the position shown in FIG. 2, and the reciprocating magnets located near the opposite end of their range of travel;

FIG. 9 is a top view of an alternate arrangement of the rotor magnets, wherein they are disposed horizontally and rotated ninety degrees from the position shown in FIG. 2, and the reciprocating magnets are located near an end of their range of displacement;

FIG. 10 is a top view showing the rotor magnet arrangement of FIG. 9 rotated one-half revolution from the position shown in FIG. 9, and the reciprocating magnets located near the opposite end of their range of displacement;

DETAILED DESCRIPTION OF THE PREFERRED EMBODIMENT

Figure 1A:
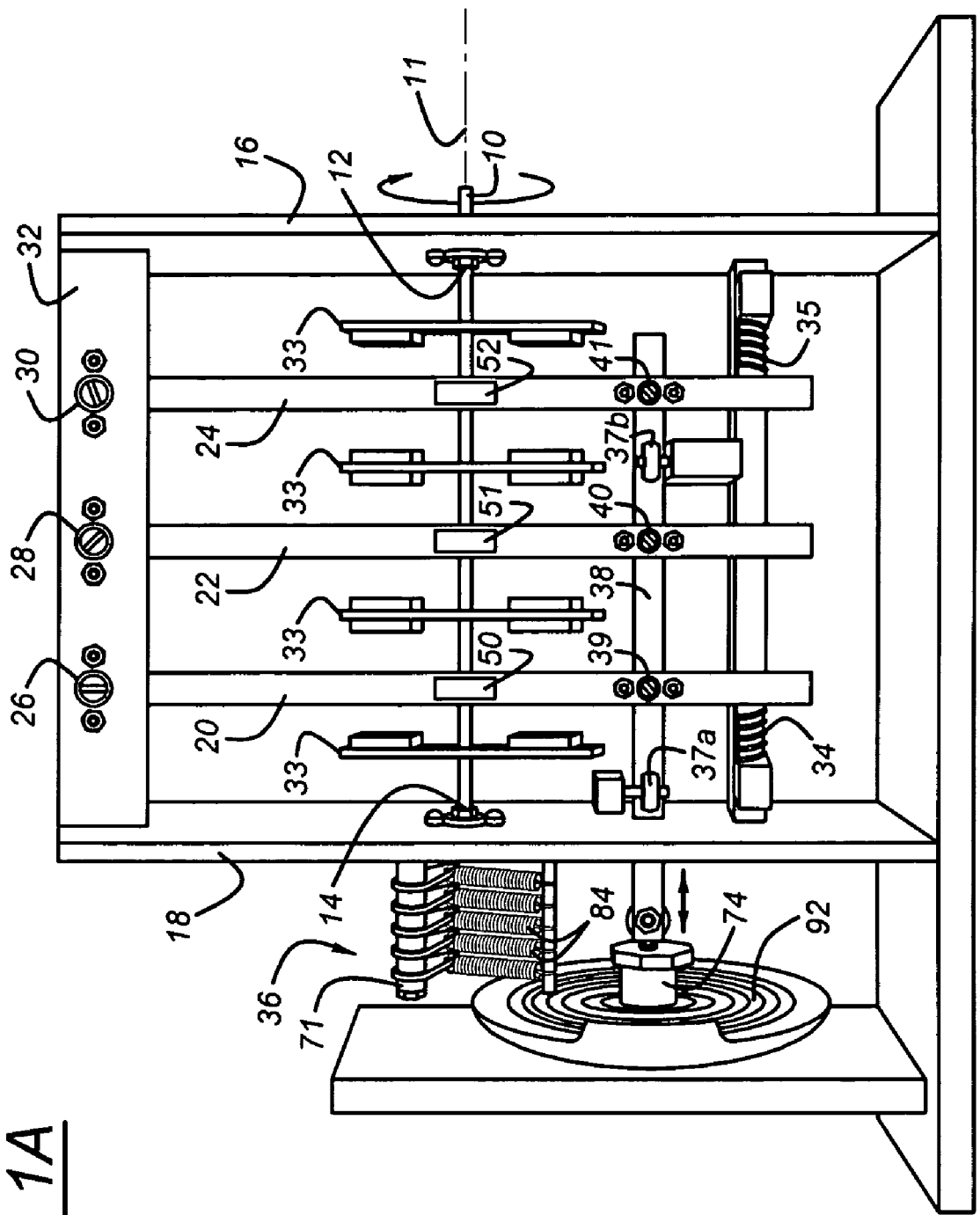
FIG. 1A is a side view of a drive motor according to this invention.
Figure 1B:
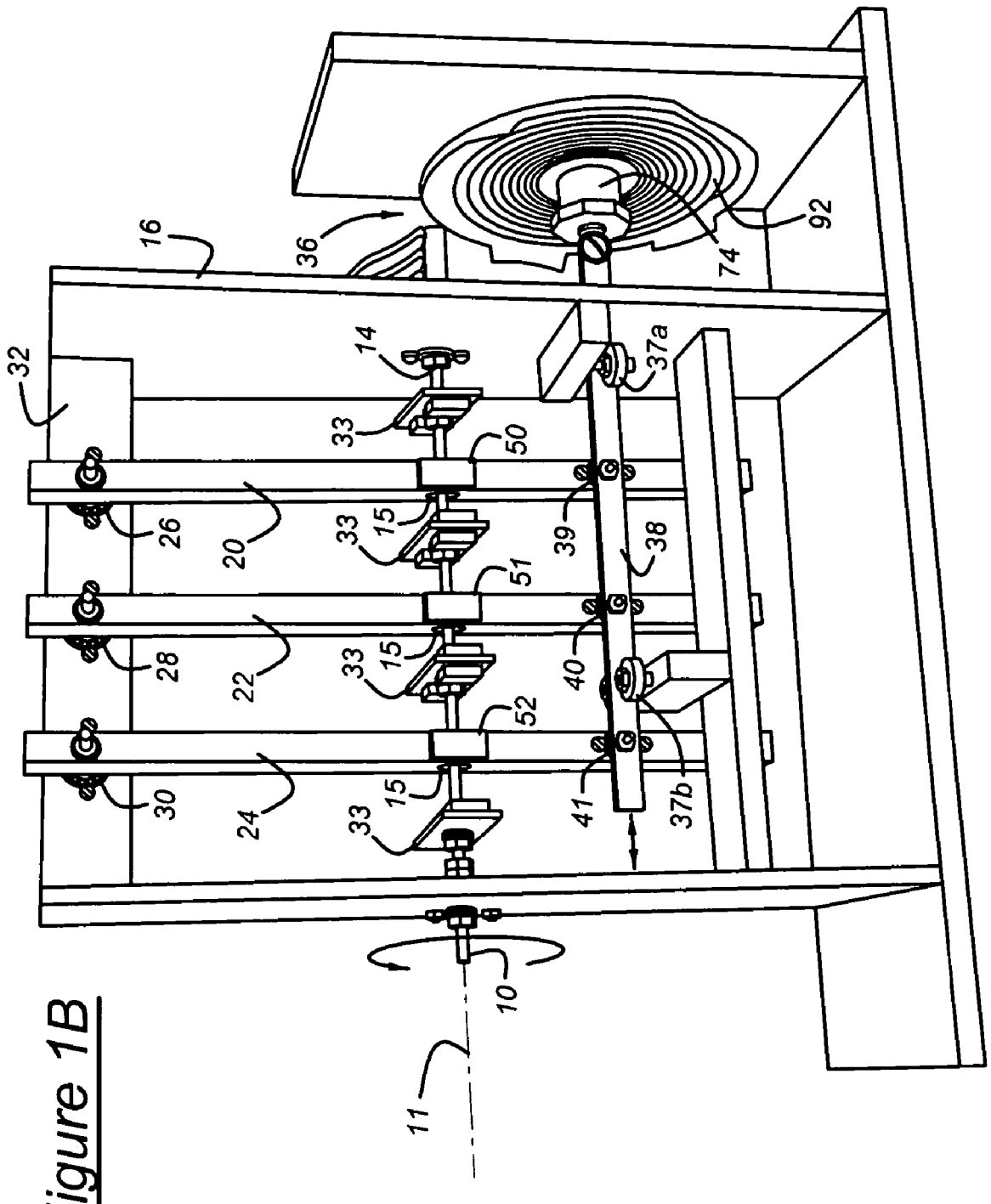
FIG. 1B is a perspective view of the drive motor of FIG. 1A viewed from the opposite side.

A drive motor according to this invention, illustrated in FIGS. 1A and 1B includes a rotor shaft 10 supported for rotation about axis 11 on bearings 12, 14 located on vertical supports 16, 18 of a frame. An oscillator mechanism includes oscillator arms 20, 22, 24 pivotally supported on bearings 26, 28, 30, respectively, secured to a horizontal support 32, which is secured at each axial end to the vertical supports 16, 18. The oscillator arms 20, 22, 24 are formed with through holes 15 aligned with the axis 11 of rotor shaft 10, the holes permitting rotation of the rotor shaft and pivoting oscillation of arms without producing interference between the rotor and the arms.

Extending in opposite diametric directions from the rotor axis 11 and secured to the rotor shaft 10 are four plates 33, axially spaced mutually along the rotor axis, each plate supporting permanent rotor magnets secured to the plate and rotating with the rotor shaft. Each pivoting oscillator arms 20, 22, 24 of the oscillator mechanism supports permanent reciprocating magnets located between the rotor magnets of the rotor shaft. Helical coiled compression return springs 34, 35 apply oppositely directed forces to oscillator arms 20 and 24 as they pivot about their respective pivotal supports 26, 30, respectively. Relative to the point of view of FIGS. 1A and 1B, when spring 34 is compressed by displacement of oscillator arm, the spring applies a rightward force to oscillator arm 20 tending to return it to its neutral, undisplaced position. When spring 35 is compressed by displacement of arm 24, the spring applies a leftward force to oscillator arm 24 tending to return it to its neutral position.

The oscillator arms 20, 22, 24 oscillate about their supported bearings 26, 28, 30, as they move in response to an actuator 36, which includes a actuator arm 38, secured through bearings at 39, 40, 41 to the oscillator arms 20, 22, 24, respectively. Actuator 36 causes actuator arm 38 to reciprocate linearly leftward and rightward from the position shown in FIGS. 1A and 1B. The bearings 39, 40, 41 allow the oscillator arms 20, 22, 24 to pivot and the strut to translate without mutual interference. Pairs of guide wheels 37a, 37b spaced along actuator arm 38, each include a wheel located on an opposite side of actuator arm 38 from another wheel of the wheel-pair, for guiding linear movement of the strut and maintaining the oscillator arms 20, 22, 24 substantially in a vertical plane as they oscillate. Alternatively, the oscillator arms 20, 22, 24 may be replaced by a mechanism that allows the magnets on the oscillator arms to reciprocate linearly with actuator arm 38 instead of pivoting above the rotor shaft 10 at 26, 28, 30.

FIG. 2 shows a first arrangement of the permanent rotor magnets 42-49 that rotate about axis 11 and are secured to the rotor shaft 10, and the permanent reciprocating magnets 50-52 that move along axis 11 and are secured to the oscillating arms 20, 22, 24. Each magnet has a pole of reference polarity and a pole of opposite polarity from that of the reference polarity. For example, rotor magnets 42, 44, 46, 48, located on one side of axis 11, each have a north, positive or reference pole 54 facing actuator 36 and a south, negative or opposite pole 56 facing away from the actuator. Similarly rotation magnets 43, 45, 47, 49, located diametrically opposite from rotor magnets 42, 44, 46, 48, each have a south pole facing toward actuator 36 and a north pole facing away from the actuator. The north poles 54 of the reciprocating magnets 50-52 face rightward relative to the point of view shown in FIGS. 2 and 3. Their south poles 56 face leftward.

Figure 4:
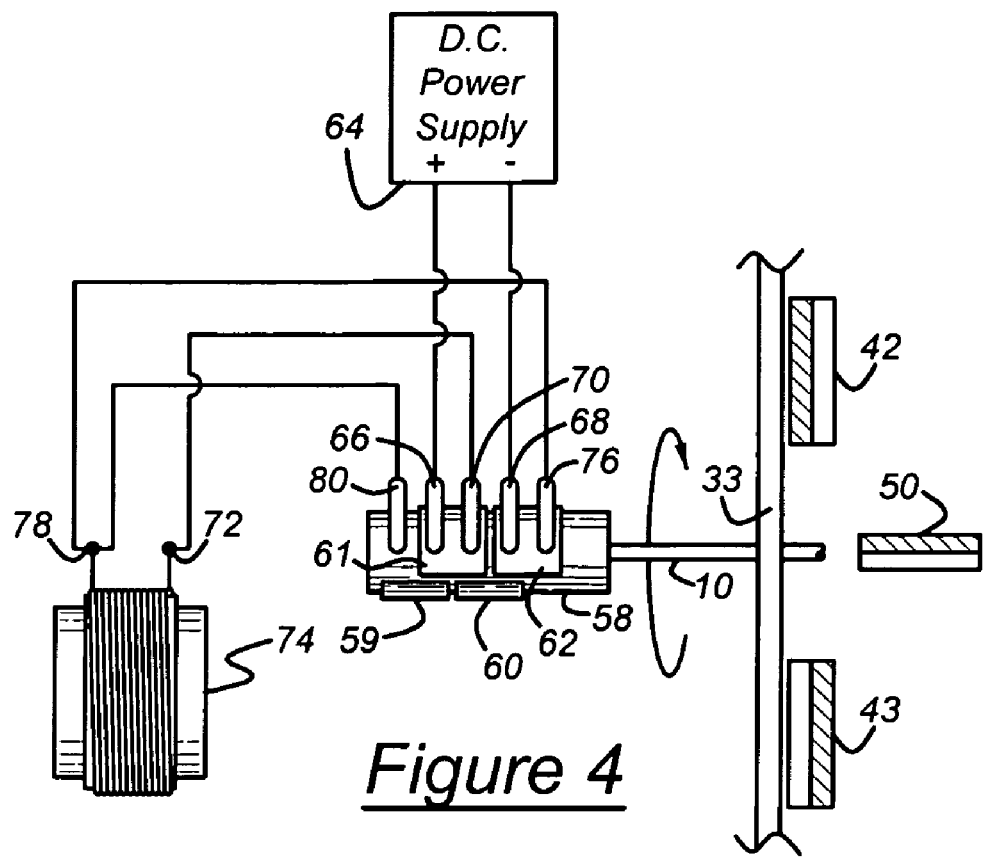
FIG. 4 is a schematic diagram of a first state of the actuator switching assembly of the drive motor of FIG. 1.
Figure 5:
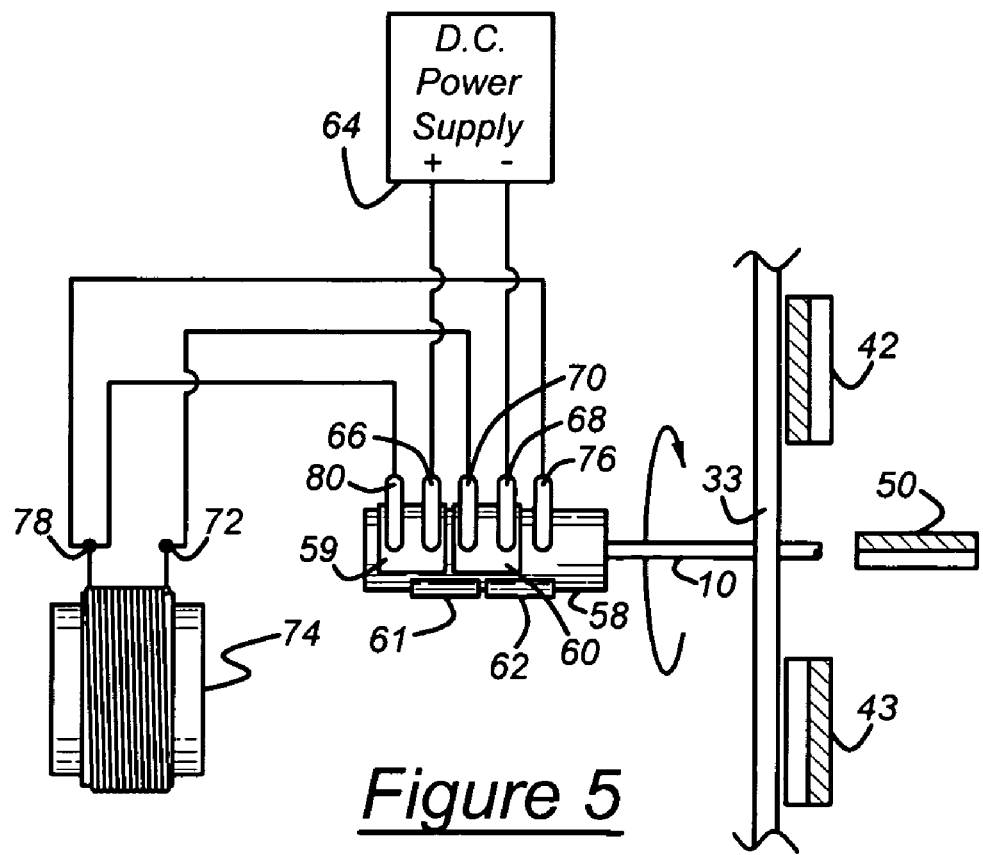
FIG. 5 is a schematic diagram of a second state of the actuator switching assembly of the drive motor of FIG. 1.

FIG. 4 shows a switch assembly located in the region of the left-hand end of rotor shaft 10. A cylinder 58, preferably formed of PVC is secured to rotor shaft 10. Cylinder 58 has contact plates 59, 60, preferably of brass, located on its outer surface, aligned angularly, and extending approximately 180 degrees about the axis 11, as shown in FIG. 5. Cylinder 58 has contact plates 61, 62, preferably of brass, located on its outer surface, aligned angularly, extending approximately 180 degrees about the axis 11, and offset axially with respect to contact plates 59, 60.

A d.c. power supply 64 has its positive and negative terminals connected electrically by contact fingers 66, 68 to contact plates 61, 62, respectively. A third contact finger 70, shown contacting plate 61, electrically connects terminal 72 of a solenoid 74 to the positive terminal of the power supply 64 through contact finger 66 and contact plate 61. A fourth contract finger 76, shown contacting plate 62, electrically connects terminal 78 of solenoid 74 to the negative terminal of the power supply 64 through contact finger 68 and contact plate 62. A fifth contact finger 80, axially aligned with contact plate 59 and offset axially from contact plate 61, is also connected to terminal 78 of solenoid 74.

Preferably the d.c. power supply 64 is a nine volt battery, or a d.c. power adaptor, whose input may be a conventional 120 volt, 60 Hz power source. The d.c. power supply and switching mechanism described with reference to FIGS. 4-7, may be replaced by an a. c. power source connected directly across the terminals 72, 78 of solenoid 74. As the input current cycles, the polarity of solenoid 74 alternates, the actuator arm 38 moves relative to the toroidal magnet 90 (shown in FIG. 8), and the reciprocating magnets 50-52 reciprocate on the oscillating arms 20, 22, 24, which are driven by the actuator arm 38.

FIG. 5 shows the state of the switch assembly when rotor shaft 10 has rotated approximately 180 degrees from the position shown in FIG. 4. When the switch assembly is in the state shown in FIG. 5, d.c. power supply 64 has its positive and negative terminals electrically connected by contact fingers 66, 68 to contact plates 59, 60, respectively. Contact finger 70, shown contacting plate 60, electrically connects terminal 72 of solenoid 74 to the negative terminal of the power supply 64 through contact finger 68 and contact plate 60. Contact finger 80, shown contacting plate 59, electrically connects terminal 78 of solenoid 74 to the positive terminal through contact finger 66 and contact plate 59. Contact finger 76, axially aligned with contact plate 62 and offset axially from contact plate 60, remains connected to terminal 78 of solenoid 74. In this way, the polarity of the solenoid 74 changes cyclically as the rotor 10 rotates through each one-half revolution.

Figure 6:
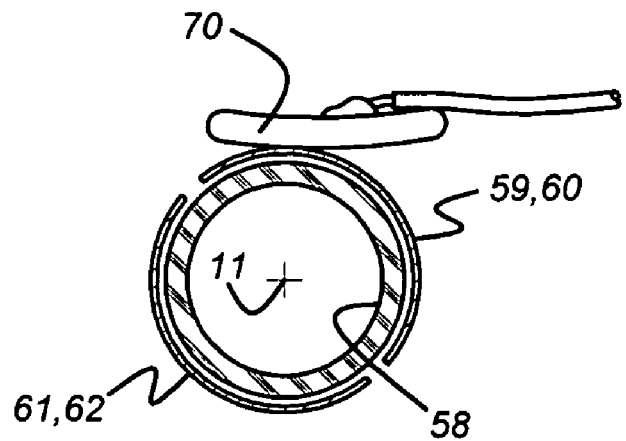
FIG. 6 is cross sectional view of a sleeve shaft aligned with the rotor shaft showing a contact finger and bridge contact plates of the switching assembly.

FIG. 6 shows in cross section the cylinder 58 driveably engaged and aligned with the rotor shaft 10, a contact finger 70, and the contact plates 59-62 of the switching assembly, which rotate with the rotor shaft and cylinder about the axis 11.

Figure 7:
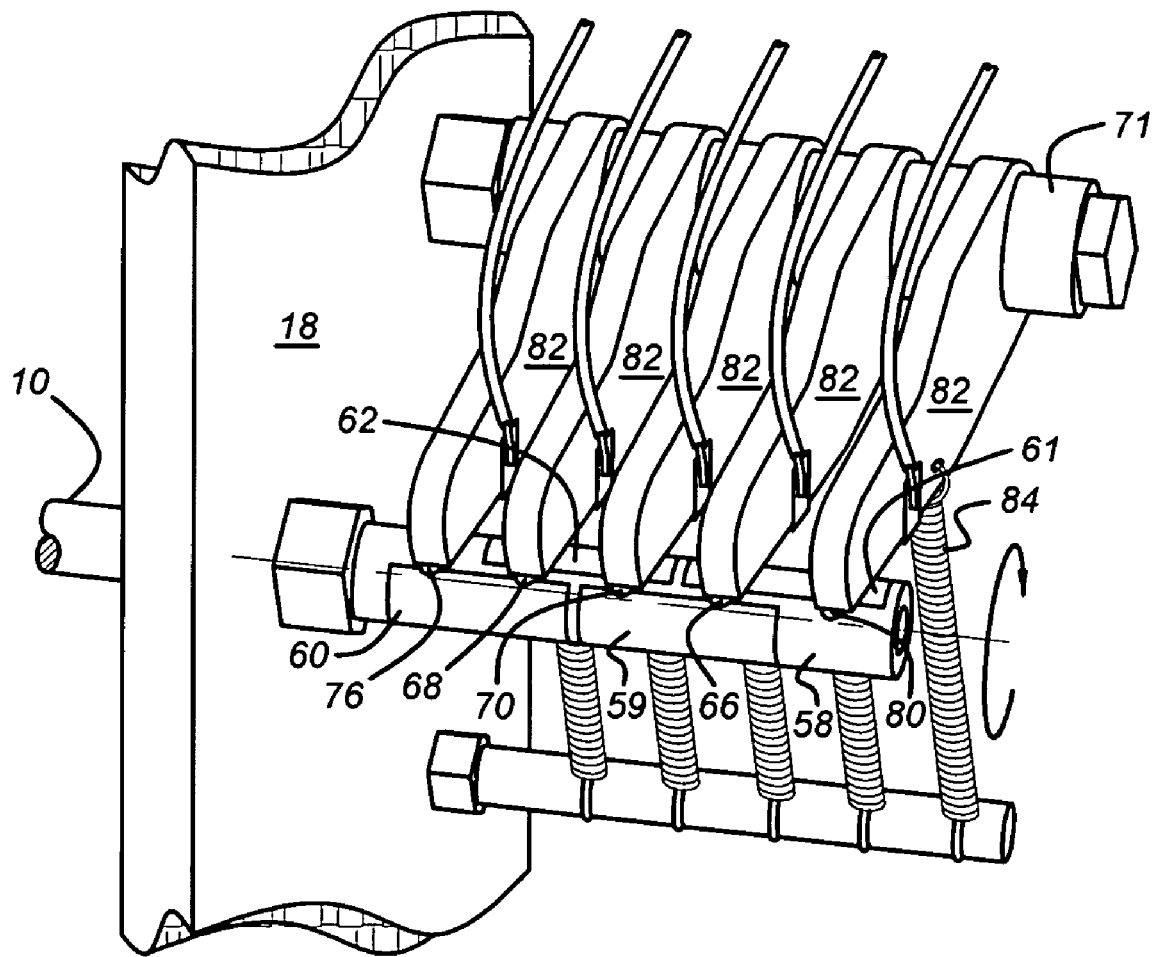
FIG. 7 is an isometric view showing the switching contact fingers secured on pivoting arms and seated on the bridge connectors of the switching assembly.

As FIG. 7 illustrates, axially spaced arms 82 are supported on a stub shaft 71, preferably of Teflon or another lubricious material to facilitate the arms' pivoting about the axis of the shaft 71. Each contact finger 66, 68, 70 76, 80 is located at the end of a arm 82, and tension springs 84, secured to each arm 82, urge the contact fingers 66, 68, 70, 76, 80 continually toward engagement with the contact plates 59-62.

Figure 8:
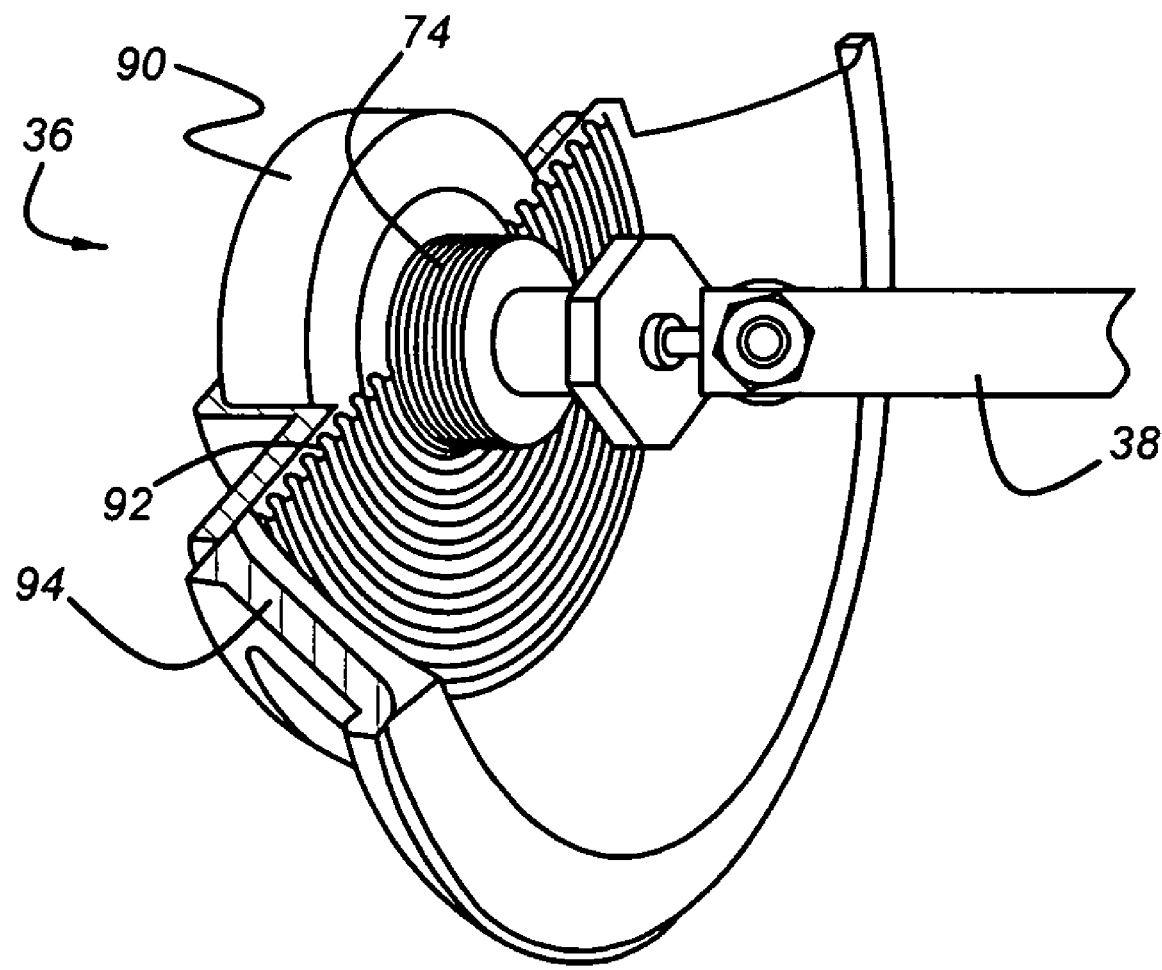
FIG. 8 is isometric cross sectional view showing a driver that includes a solenoid and permanent magnet for oscillating the actuator arm in response to rotation of the rotor shaft.

FIG. 8 illustrates the actuator 36 for reciprocating the actuator arm 38 in response to rotation of the rotor shaft 10 and the alternating polarity of the solenoid 74. The actuator 36 includes the solenoid 74, a toroidal permanent magnet 90, an elastically flexural spider 92 for supporting the solenoid above the plane of the magnet, and a basket or frame 94, to which the spider is secured. The actuator arm 38 is secured to solenoid 74. The polarity of the solenoid 74 changes as rotor shaft 10 rotates, causing the solenoid and actuator arm 38 to reciprocate due to the alternating polarity of the solenoid relative to that of the toroidal permanent magnet 90. As the solenoid polarity changes, the actuator arm 38 reciprocates linearly due to the alternating forces of attraction and repulsion of the solenoid 74 relative to the poles of the magnet 90. The actuator arm 38 is secured to the oscillator arms 20, 22, 24 causing them to pivot, and the reciprocating magnets 50-52 secured to the oscillator arms to reciprocate. Alternatively, the reciprocating magnets 50-52 can be secured directly to the arm 38, so that the magnets 50-52 reciprocate without need for an intermediary oscillating component.

It is important to note at this point in the description that, when two magnets approach each other with their poles of like polarity facing each other but slightly offset, there is a tendency for the magnets to rotate to the opposite pole of the other magnet. Therefore, in the preferred embodiment of the instant invention, the angular position at which the switch assembly of the actuator 36 changes between the states of FIGS. 4 and is slightly out of phase with the angular position of the rotor shaft 10 to help sling or propel the actuator arm 38 in the reverse direction at the preferred position of the rotor shaft. The optimum phase offset is approximately 5-8 degrees. This way, advantage is taken of each rotor magnet's tendency to rotate about its own magnetic field when slightly offset from the respective reciprocating magnet, and the repulsive force between like poles of the reciprocating magnets and the rotor magnets is optimized to propel the rotor magnet about the rotor axis 11, thereby increasing the drive motor's overall efficiency.

Figure 12:
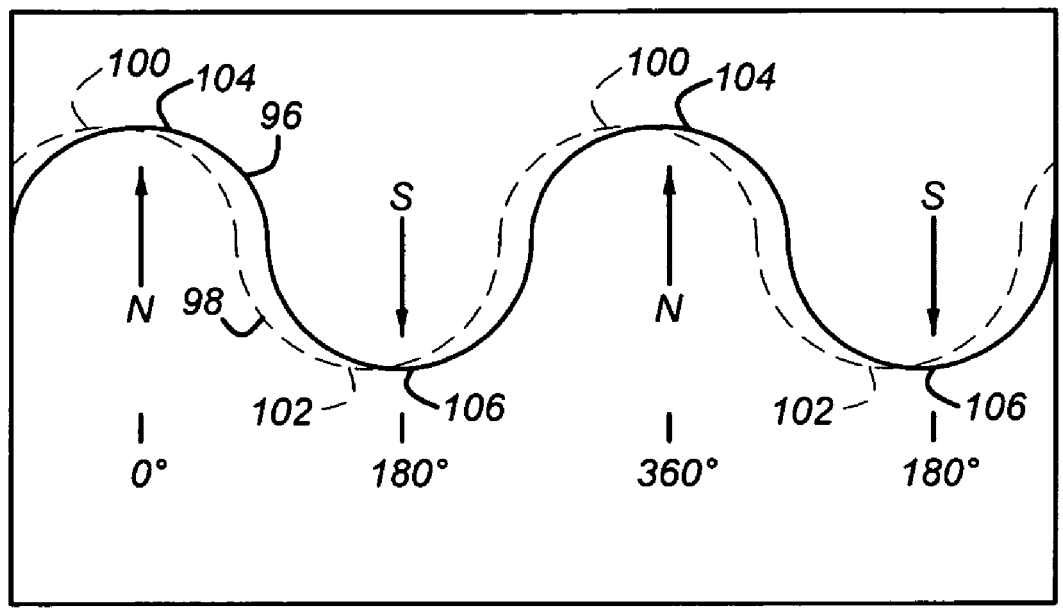
FIG. 12 a graph showing the angular displacement of the rotor shaft 10 and linear displacement of the reciprocating magnets.

FIG. 12 is a graph showing the angular displacement 96 of the rotor shaft 10 and linear displacement 98 of the reciprocating magnets 50-52. Point 100 represents the end of the range of displacement of the reciprocating magnets 50-52 shown in FIGS. 2 and 9, and point 102 represents the opposite end of the range of displacement of the reciprocating magnets 50-52 shown in FIGS. 3 and 10. Point 104 represents the angular position of the rotor magnets 42-49 when in the horizontal plane shown in FIGS. 2 and 9, and point 106 represents the angular position of the rotor magnets 42-49 when rotated one-half rotation to the horizontal plane shown in FIGS. 3 and 10. Preferably, the reciprocating magnets 50-52 and rotor magnets 42-49 are out of phase: the reciprocating magnets lead and the rotor magnets lag by several degrees. The reciprocating magnets 50-52 reach the respective extremities of their range of travel before rotor rotation moves the rotor magnets 42-49 into the horizontal plane.

When the reference poles 54 and opposite poles 56 of the rotor magnets 42-49 and reciprocating magnets 50-52 are arranged as shown in FIGS. 2 and 3, the rotor position is stable when the rotor magnets are in a horizontal plane. The rotor position is unstable in any other angular position, moves toward horizontal stability from any unstable position, and is least stable when the rotor magnets 42-49 are in a vertical plane. The degree of stability of the rotor shaft 10 is a consequence of the mutual attraction and repulsion of the poles of the rotor magnets 42-49 and reciprocating magnets 50-52 and the relative proximity among the poles. In FIG. 2, the reciprocating magnets 50-52 are located at a first extremity of travel. In FIG. 3, the reciprocating magnets 50-52 have reciprocated to the opposite extremity of travel, and the rotor magnets have rotated one-half revolution from the position shown in FIG. 2.

When the rotor is stopped, its rotation can be easily started manually by applying torque in either direction. Actuator 36 sustains rotor rotation after it is connecting to its power source. Rotation of rotor shaft 10 about axis 11 is aided by cyclic movement of the reciprocating magnets 50-52, their axial location between the rotor magnet pairs 42-43, 44-45, 46-47, 48-49, the disposition of their poles in relation to the poles of the rotor magnets, and the frequency and phase relationship of their reciprocation relative to rotation of the rotor magnets. Actuator 36 maintains the rotor 10 rotating and actuator arm 38 oscillating at the same frequency, the phase relationship being as described with reference to FIG. 12.

With the rotor magnets 42, 49 as shown in FIG. 2, when viewed from above, the north poles 54 of the rotor magnets on the left-hand side of axis 11 face a first axial direction 110, i.e., toward the actuator 36, and the north poles 54 of the rotor magnets on the right-hand side of axis 11 face in the opposite axial direction 112, away from actuator 36. When the rotor magnets 42-49 are located as in FIG. 2, the north poles 54 of reciprocating magnets 50-52 are adjacent the south poles 56 of rotor magnets 45, 47, 49, and the south poles 56 of reciprocating magnets 50-52 are adjacent the north poles 54 of rotor magnets 44, 46, 48.

Furthermore, when the rotor shaft 10 rotates to the position shown in FIG. 2, the reciprocating magnets 50-52 are located at or near one extremity of their axial travel, such that the north poles 54 of reciprocating magnets 50-52 are located close to the south poles 56 of rotor magnets 45, 47, 49, respectively, and relatively more distant from the north poles 54 of rotor magnets 43, 45, 47, respectively. Similarly, the south poles 56 of reciprocating magnets 50-52 are located close to the north poles of rotor magnet 44, 46, 48, respectively, and relatively more distant from the south poles of rotor magnets 42, 44, 46, respectively.

With the rotor magnets 42, 49 rotated into a horizontal plane one-half revolution from the position of FIG. 11B, when viewed from above as shown in FIG. 3, the north poles 54 of reciprocating magnets 50-52 are located adjacent the south poles of rotor magnets 42, 44, 46, and the south poles 56 of reciprocating magnets 50-52 are located adjacent the north poles 54 of rotor magnets 43, 45, 47. When the rotor shaft 10 is located as shown in FIG. 3, the reciprocating magnets 50-52 are located at or near the opposite extremity of their axial travel from that of FIG. 2, such that the north poles 54 of reciprocating magnets 50-52 are located close to the south poles 56 of rotor magnet 42, 44, 46, respectively, and relatively more distant from the north poles of rotor magnets 44, 46, 48, respectively. Similarly, when the rotor shaft 10 is located as shown in FIG. 3, the south poles 56 of reciprocating magnets 50-52 are located close to the north poles of rotor magnet 43, 45, 47, respectively, and relatively more distant from the south poles of rotor magnets 45, 47, 49, respectively.

In operation, rotation of rotor shaft 10 in either angular direction is started manually or with a starter-actuator (not shown). Actuator 36 causes reciprocating magnets 50-52 to oscillate or reciprocate at the same frequency as the rotational frequency of the rotor shaft 10, i.e., one cycle of reciprocation per cycle of rotation, preferably with the phase relationship illustrated in FIG. 12. When the reciprocating magnets 50-52 are located as shown in FIG. 2, the rotor shaft 10 will have completed about one-half revolution from the position of FIG. 3 to the position of FIG. 2.

Rotation of the rotor 10 is aided by mutual attraction between the north poles 54 of reciprocating magnets 50-52 and the south poles 56 of the rotor magnets 43, 45, 47, 49 that are then closest respectively to those north poles of reciprocating magnets 50-52, and mutual attraction between the south poles of reciprocating magnets 50-52 and the north poles of the rotor magnets 42, 44, 46, 48 that are then closest respectively to the north poles of the reciprocating magnets.

Assume rotor shaft 10 is rotating counterclockwise when viewed from the actuator 36, and rotor magnets 42, 44, 46, 48 are located above rotor magnets 43, 45, 47, and 49. With the rotor shaft 10 so disposed, the reciprocating magnets 50-52 are approximately mid-way between the positions shown in FIGS. 2 and 3 and moving toward the position shown in FIG. 2. As rotation proceeds, the south pole of each reciprocating magnet 50-52 attracts downward the north pole 54 of the closest rotor magnet 44, 46, 48, and the north pole 54 of each reciprocating magnet 50-52 attracts upward the south pole 56 of the closest rotor magnet 45, 47, 49. This mutual attraction of the poles causes the rotor to continue rotating counterclockwise to the position of FIG. 2.

Then the reciprocating magnets 50-52 begin to move toward the position shown in FIG. 3, and rotor inertia overcomes the steadily decreasing force of attraction between the poles as they move mutually apart, permitting the rotor shaft 10 to continue its counterclockwise rotation into the vertical plane where rotor magnets 43, 45, 47, 49 are located above rotor magnets 42, 44, 46, 48. As rotor shaft 10 rotates past the vertical plane, the reciprocating magnets 50-52 continue to move toward the position of FIG. 3, the south pole 56 of each reciprocating magnet 50-52 attracts downward the north pole of the closest rotor magnet 43, 45, 47, and the north pole 54 of each reciprocating magnet 50-52 attracts upward the south pole 56 of the closest rotor magnet 42, 44, 46, causing the rotor 10 to rotate counterclockwise to the position of FIG. 3. Rotor inertia maintains the counterclockwise rotation, the reciprocating magnets 50-52 begin to move toward the position shown in FIG. 2, and the rotor 10 returns to the vertical plane where rotor magnets 43, 45, 47, 49 are located above rotor magnets 42, 44, 46, 48, thereby completing one full revolution.

FIGS. 9 and 10 show a second arrangement of the drive motor in which the poles of the rotor magnets 142-149 are parallel to, and face the same direction as those of the reciprocating magnets 50-52. Operation of the drive motor arranged as shown in FIGS. 9 and 10 is identical to the operation described with reference to FIGS. 2 and 3. In the embodiment of FIGS. 9 and 10, the poles of the reciprocating magnets 50-52 face more directly the poles of the rotor magnets 142-149 than in the arrangement of FIGS. 2 and 3. The forces of attraction and repulsion between the poles are greater in the embodiment of FIGS. 9 and 10; therefore, greater torque is developed. The magnitude of torque is a function of the magnitude of the magnetic forces, and the distance through which those force operate.

Figure 11:
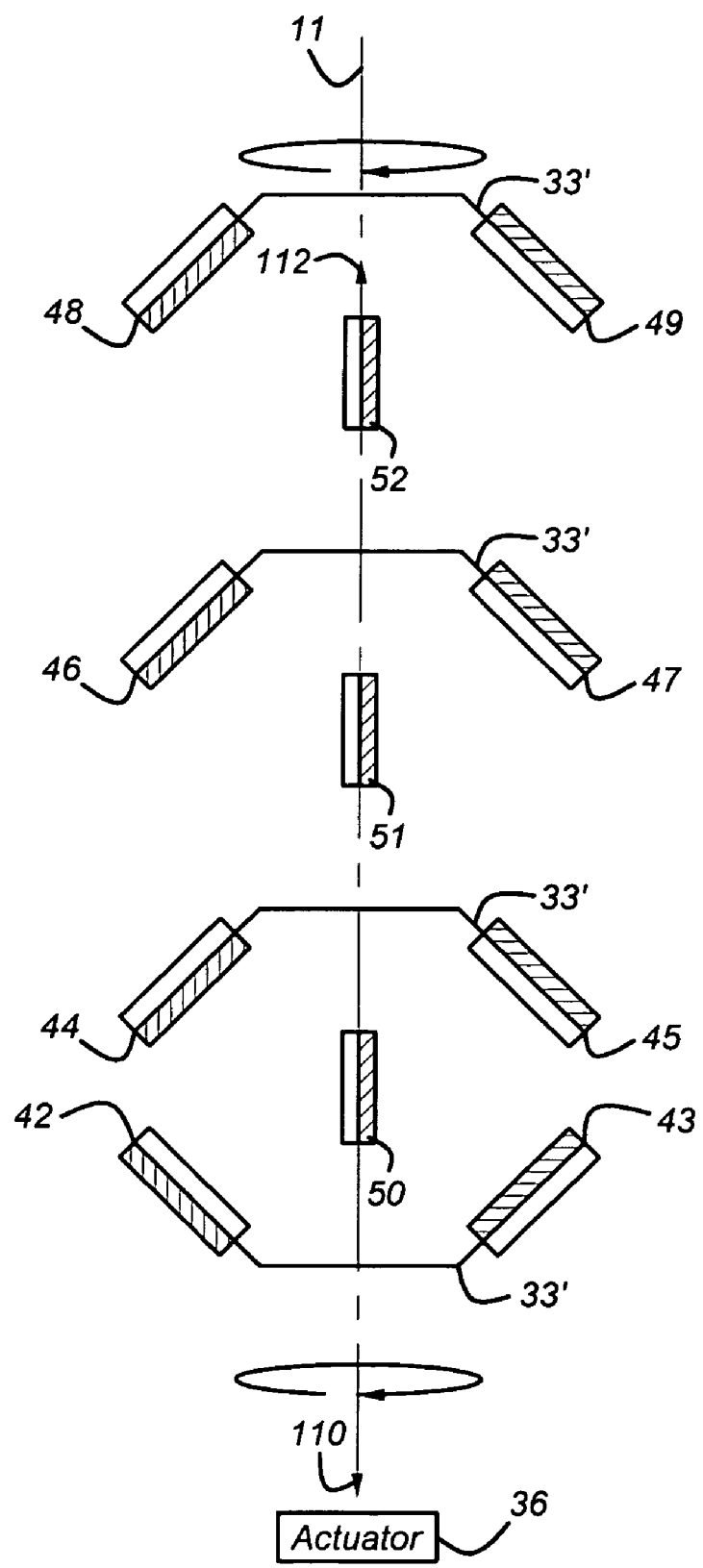
FIG. 11 is a top view of the drive motor showing a third arrangement of the rotor magnets, which are canted with respect to the axis and the reciprocating magnets.

FIG. 11 shows a third embodiment of the drive motor in which the radial outer portion of the rotor plates 33' are skewed relative to the axis 11 such that the poles of the rotor magnets 42-49 are canted relative to the poles of the reciprocating magnets 50-52. Operation of the drive motor arranged as shown in FIG. 11 is identical to the operation described with reference to FIGS. 2 and 3.

Figure 13:
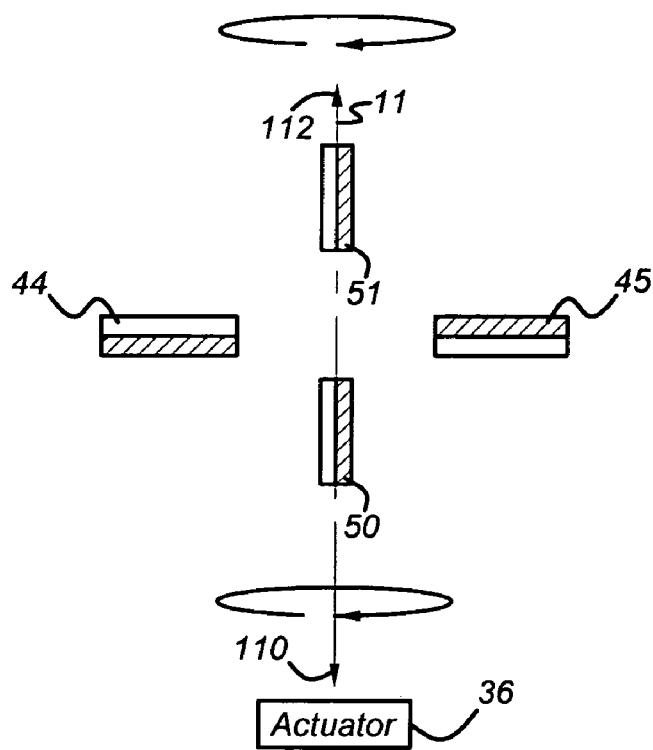
FIG. 13 is a top view of a pair of rotor magnets disposed horizontally and reciprocating magnets located near one end of their range of travel.
Figure 14:
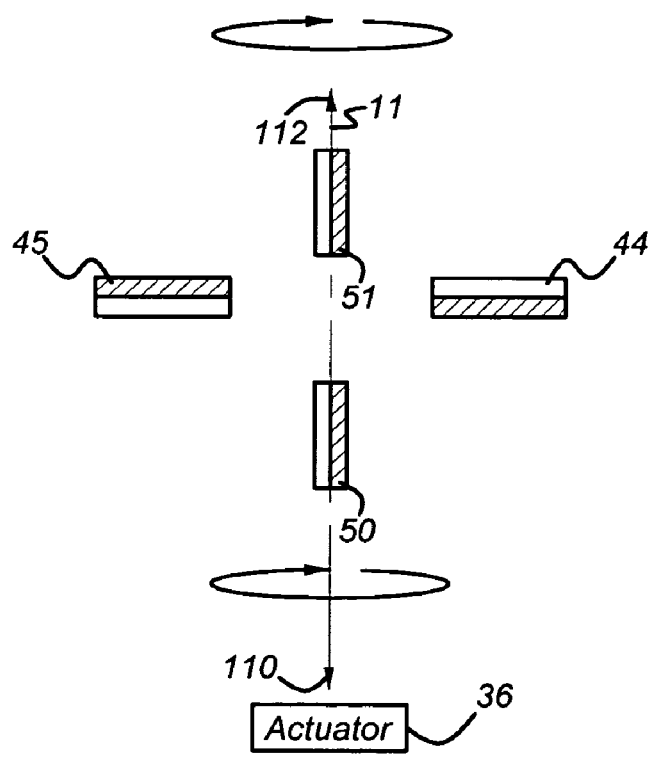
FIG. 14 is a top view of the drive motor of FIG. 13 showing the rotor magnets rotated one-half revolution from the position shown in FIG. 13, and the reciprocating magnets located near the opposite end of their range of travel.

FIGS. 13 and 14 show a fourth embodiment of the drive motor, in which each of two reciprocating magnets 50, 51 is located on an axially opposite side of a rotor magnet pair 44, 45. Operation of the drive motor arranged as shown in FIGS. 13 and 14 is identical to the operation described with reference to FIGS. 2 and 3.

The direction of the rotational output can be in either angular direction depending on the direction of the starting torque.

The drive motor can produce reciprocating output on actuator arm 38 instead of the rotational output described above upon disconnecting actuator arm 38 from actuator 36, and connecting a crank, or a functionally similar device, in the drive path between the actuator and the rotor shaft 10. The crank converts rotation of the rotor shaft 10 to reciprocation of the actuator 36. In this case, the rotor shaft 10 is driven rotatably in either direction by the power source, and the output is taken on the reciprocating arm 38, which remains driveably connected to the oscillating arms 20, 22, 24. The reciprocating magnets 50, 51, 52 drive the oscillating arms 20, 22, 24.

Figure 15:
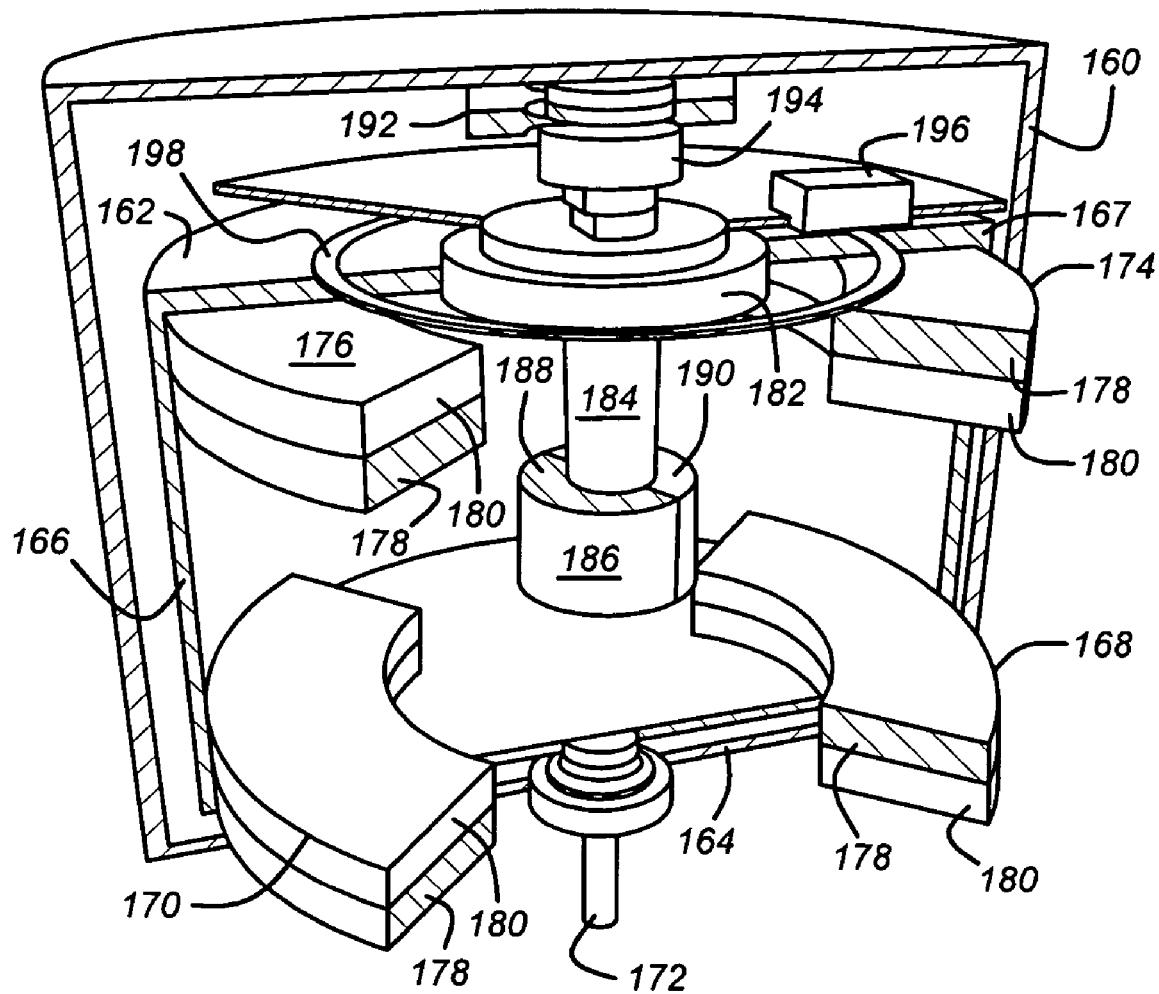
FIG. 15 is a perspective cross sectional view of yet another embodiment of the drive motor according to this invention.

In the perspective cross sectional view shown in FIG. 15, an outer casing 160 contains the drive motor according to this invention functioning essentially the same as the embodiment of the more efficient motor drive shown in FIGS. 1A and 1B, but having a more attractive commercial appearance. The rotor includes discs 162, 164, which are connected by an outer drum 166 of nonmagnetic material. The upper surface 167 of drum 166 forms a magnetic shield surrounding the rotor. Mounted on the lower disc 164 are arcuate rotor magnets 168, 170, which extend angularly about a rotor shaft 172, which is secured to the rotor. Mounted on the upper disc 162 are arcuate rotor magnets 174, 176, which extend angularly about the rotor shaft 172. The reference poles are 178, and the opposite poles are 180. A bushing 182 rotates with the rotor.

A reciprocating piston 184, which moves vertically but does not rotate, supports reciprocating magnets 186, whose reference pole 188 and opposite pole 190 extend angularly about the axis of piston 184.

A solenoid magnet 192, comparable to magnet 90 of the actuator 36 illustrated in FIG. 8, is located adjacent a solenoid 194, comparable to solenoid 74 of FIGS. 4 and 5. The polarity of solenoid 194 alternates as the rotor rotates. Simply stated, as a consequence of the alternating polarity of the solenoid 194, the reciprocating piston 184 reciprocates which, in turn, continues to more efficiently advance the rotor using the attraction and repulsion forces between the reciprocating magnets 186 and rotor magnets 168,170, 174, 176 as described above and shown in any of the different embodiments using FIGS. 2-3, 9-10, 11 and 13-14. Of course, just as the alternating polarity of the solenoid can put the drive motor in motion, so can the turning of the rotor, as described above. A photosensor 196 and sensor ring 198 can be used, as an alternative to the mechanical embodiment described in FIGS. 4-7, to cooperatively determine the angular position of the rotor so as to alternate the polarity of the solenoid 194 with the rotor to correspond with the phase and cycle shown in FIG. 12.

Figure 16:
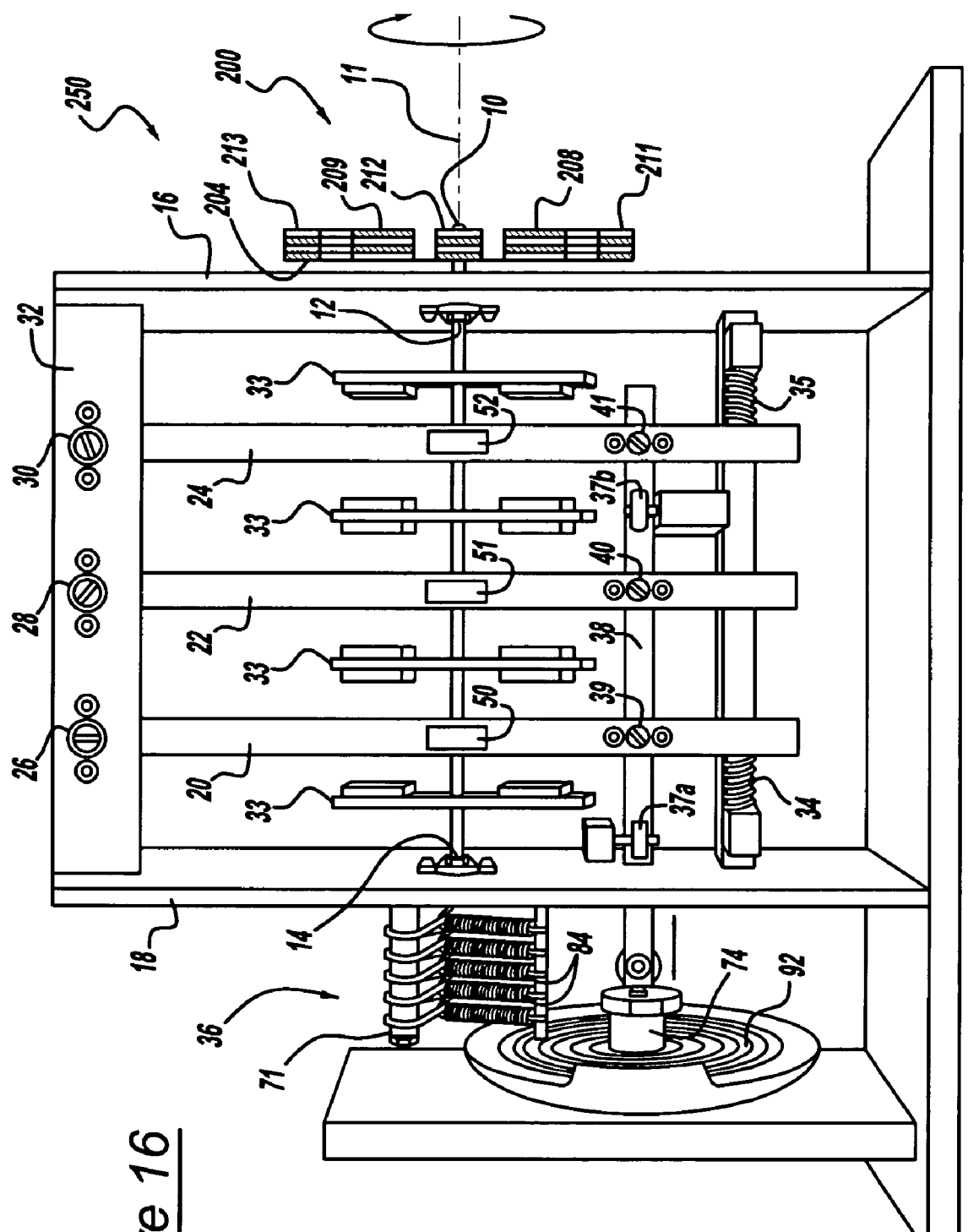
FIG. 16 is side view of the drive motor and generator magnets according to this invention.
Figure 17:
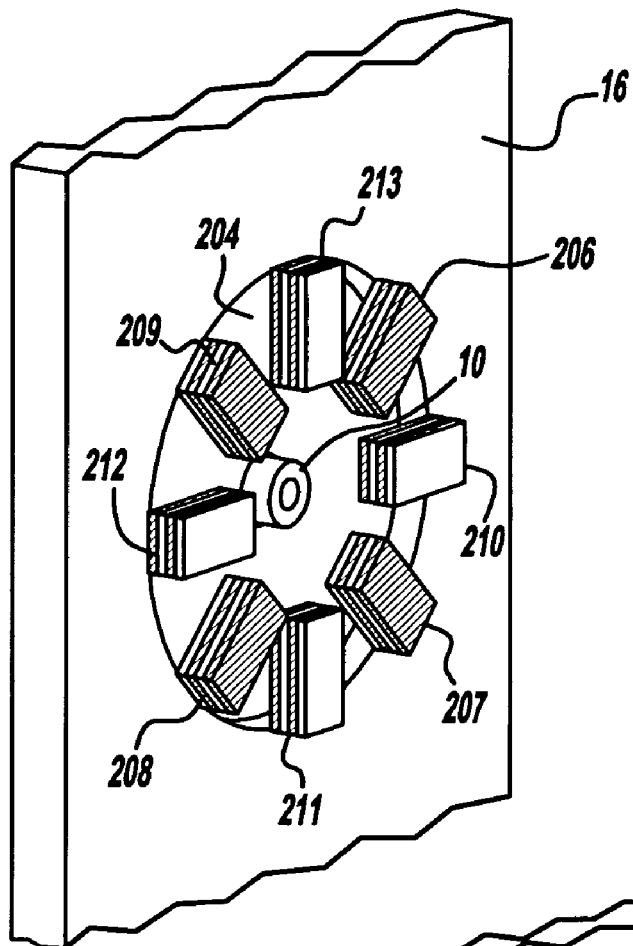
FIG. 17 is a perspective end view of the permanent generator magnets driveably connected to the drive motor as shown in FIG. 16.

A drive motor, as described with reference to FIGS. 1A-15, can be combined with an electric generator to make a permanent magnet generator 250 that will provide a source of electric power. FIGS. 16 and 17 show a generator rotor 200 secured to the axial end of the rotor shaft 10 that is opposite from the location of the actuator 36. Rotor shaft 10 extends through the vertical support 16, on which the rotor shaft 10 is supported by bearing 12. Of course, instead of the rotor shaft 10 of the drive motor being extended to the generator, it can be geared to drive a separate rotor shaft of the generator rotor 200, if so preferred. However, gearing the respective shafts may reduce the efficiency. For purposes of the preferred embodiment in this description, the rotor shaft 10 of the drive motor is continuous, simply extending through generator rotor 200.

More specifically, the generator rotor 200 includes a disc 204 secured to shaft 10, and magnets spaced angularly about axis 11 and arranged on the outer axial surface of the disc. As FIG. 17 shows, a first set of four pairs 206-209 of stacked magnets is secured to disc 204 and a second set of four pairs 210-213 of stacked magnets is secured to the disc, each pair of the second set being located between adjacent pairs of the first set. One axially face of each of the magnets of the first set 206-209 is a north pole facing away from actuator 36; the opposite axial face is a south pole facing the actuator. One axially face of each of the magnet pairs of the second set 210-213 is a south pole facing away from actuator 36; the opposite axial face is a north pole facing the actuator.

This arrangement of the dipolar magnets on the rotor disc 204 produces magnetic fields, whose lines of flux project axially from the north poles of the magnet pairs of the first set 206-209 and loop axially and angularly toward the south poles of the magnet pairs of the second set 210-213. When arranged as shown in FIG. 17, the generator rotor 200 has eight well-defined flux paths between each of the adjacent pairs of the first and second magnet sets. Those magnetic fields rotate with the rotor as the shaft 10 is driven by the permanent magnet drive motor, as previously discussed.

Figure 18:
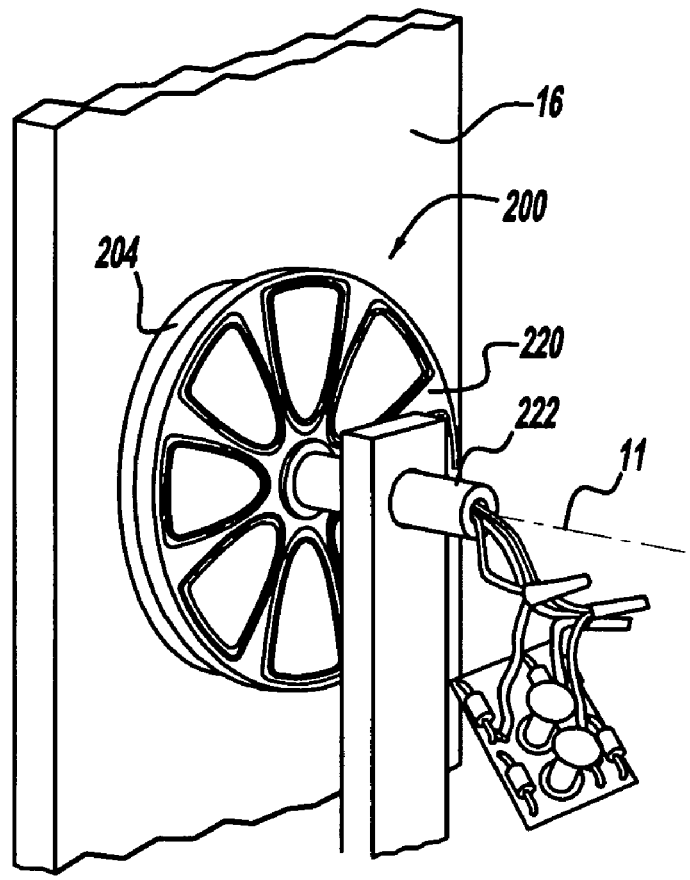
FIG. 18 is a perspective front view showing the windings of a generator stator which is supported adjacent the permanent generator magnets of FIG. 17.
Figure 19:
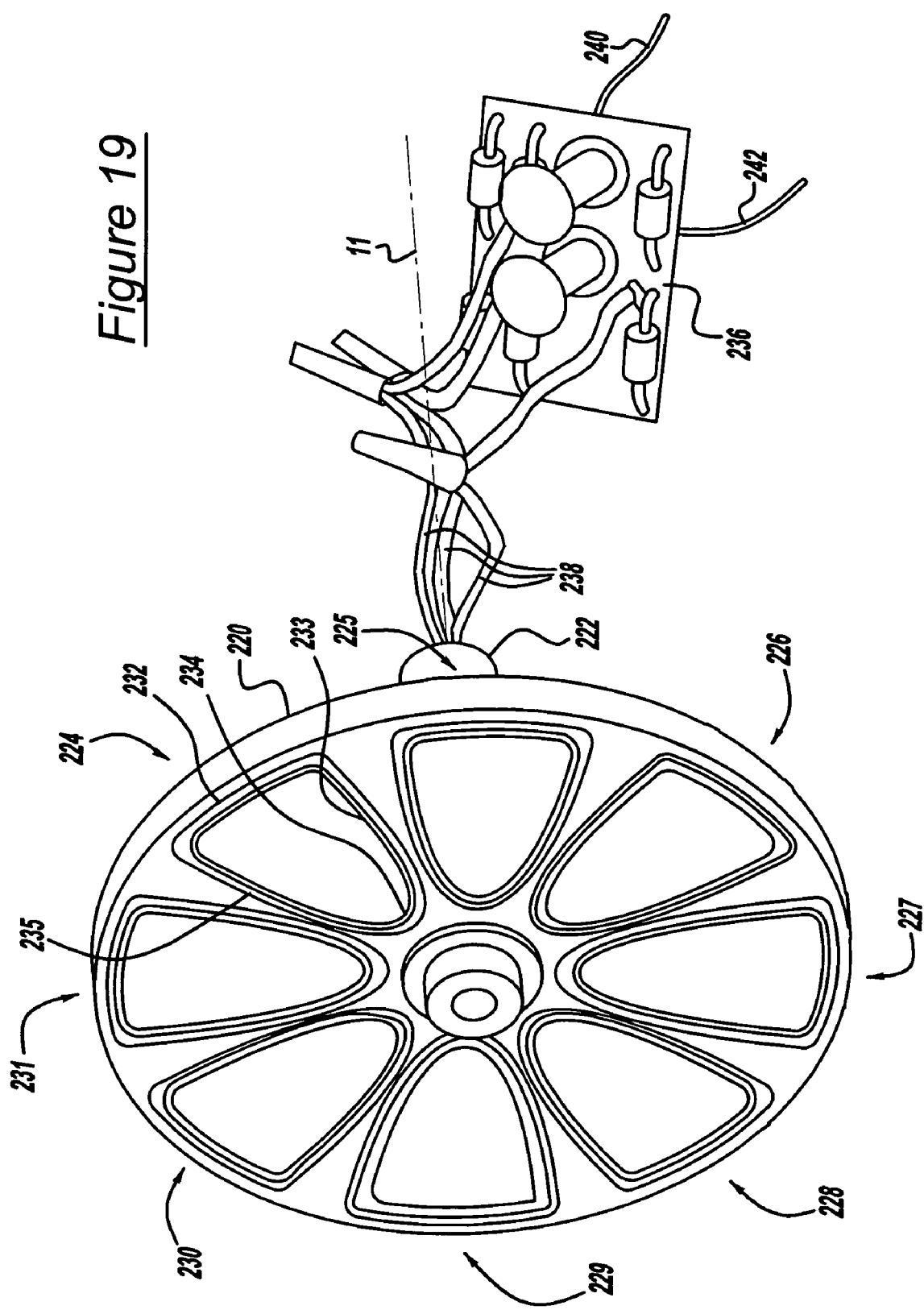
FIG. 19 is a perspective front view showing the generator stator, windings and a rectifier circuit.

Referring now to FIGS. 18 and 19, a stator 220, supported on a stator shaft 222 adjacent the axial face of the generator rotor 200, may be connected in either a four-wire star configuration or a three-wire delta configuration. In this case, the stator is shown to include eight mutually similar loops 224-231 of copper conductor windings, each loop being spaced from an adjacent loop, the eight loops being distributed about the axis of the stator, which is substantially aligned with axis 11. For example, the path traced by the conductor of winding loop 224, which is typical of the other loops 225-231, includes a circumferential length 232 that extends about 45 degrees to a radial length 233, which is directed toward axis 11 and terminates at a radially interior arc 234. Another radial length 235 extends from the end of arc 233 and radially outward to the end of circumferential length 232, which is located opposite from the end of radial length 233.

The windings 224-231 of the stator 220 may be interconnected to induce in the windings electric current having multiple phases or a single phase as the generator rotor 200 rotates past the windings of the stator. A rectifier circuit 236, connected to the leads 238 from the stator conductors, is used to convert alternating current to direct current and to remove ripple from the current signal, which is output to an electric load on leads 240, 242.

Figure 20:
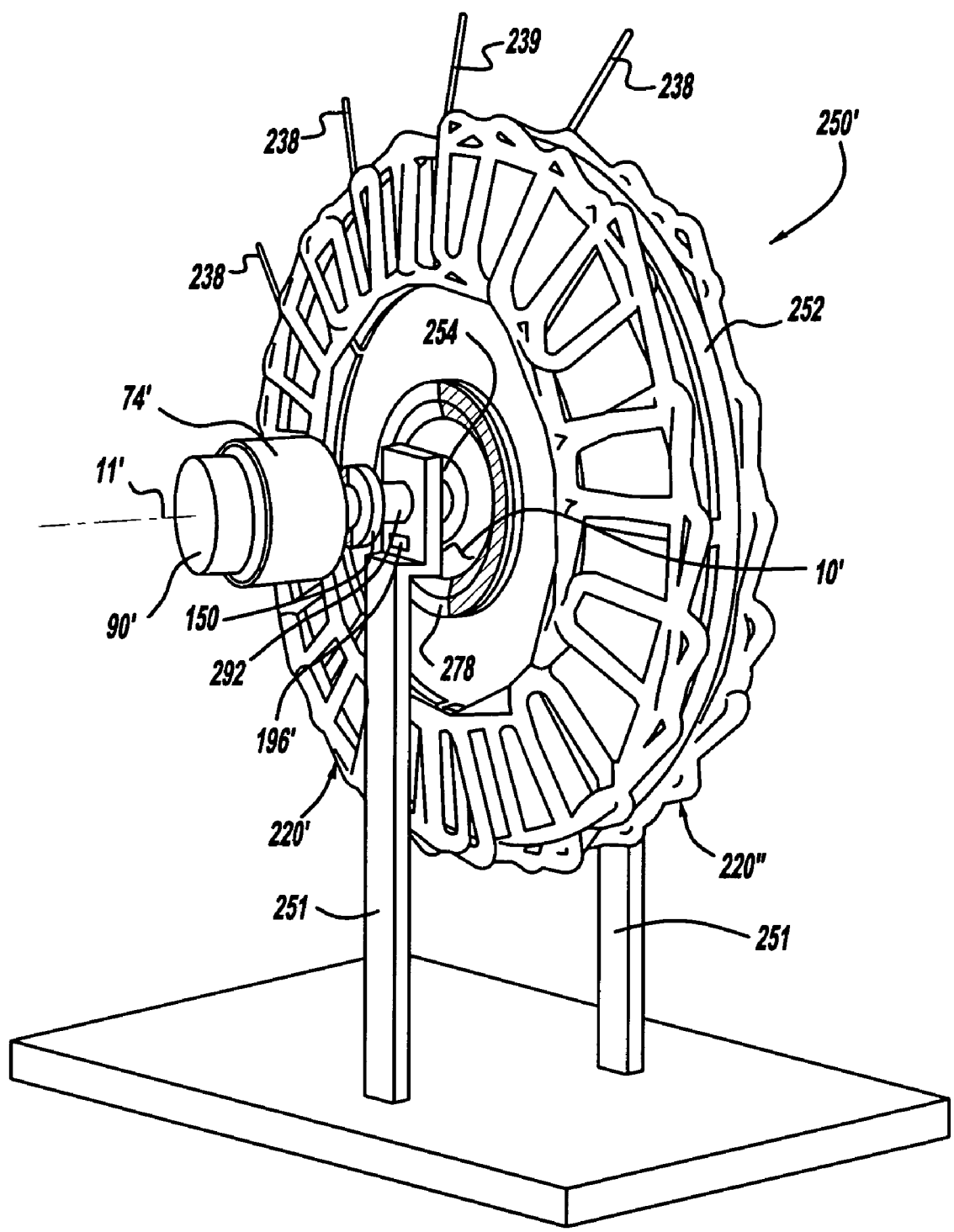
FIG. 20 is a perspective view of yet another embodiment of the assembled generator with drive motor and actuator.

FIG. 20 illustrates a more compact embodiment of a permanent magnet generator 250' having a drive motor for producing electric current. A generator rotor disc 252 is supported on a bearing 254 by a fitted rotor center support section 10' between stand support arms 251. Like the rotor shaft 10 aligned with rotor axis 11 described above, the rotor center support section 10' is aligned with the axis 11'. A generator stator 220' is supported in front of the axial surface of the disc 252. The stator 220' contains multiple windings of copper conductors arranged and interconnected preferably in a three phase configuration, the conductors having three leads 238, on which the output current signal is taken, and a neutral lead 239.

Figure 21:
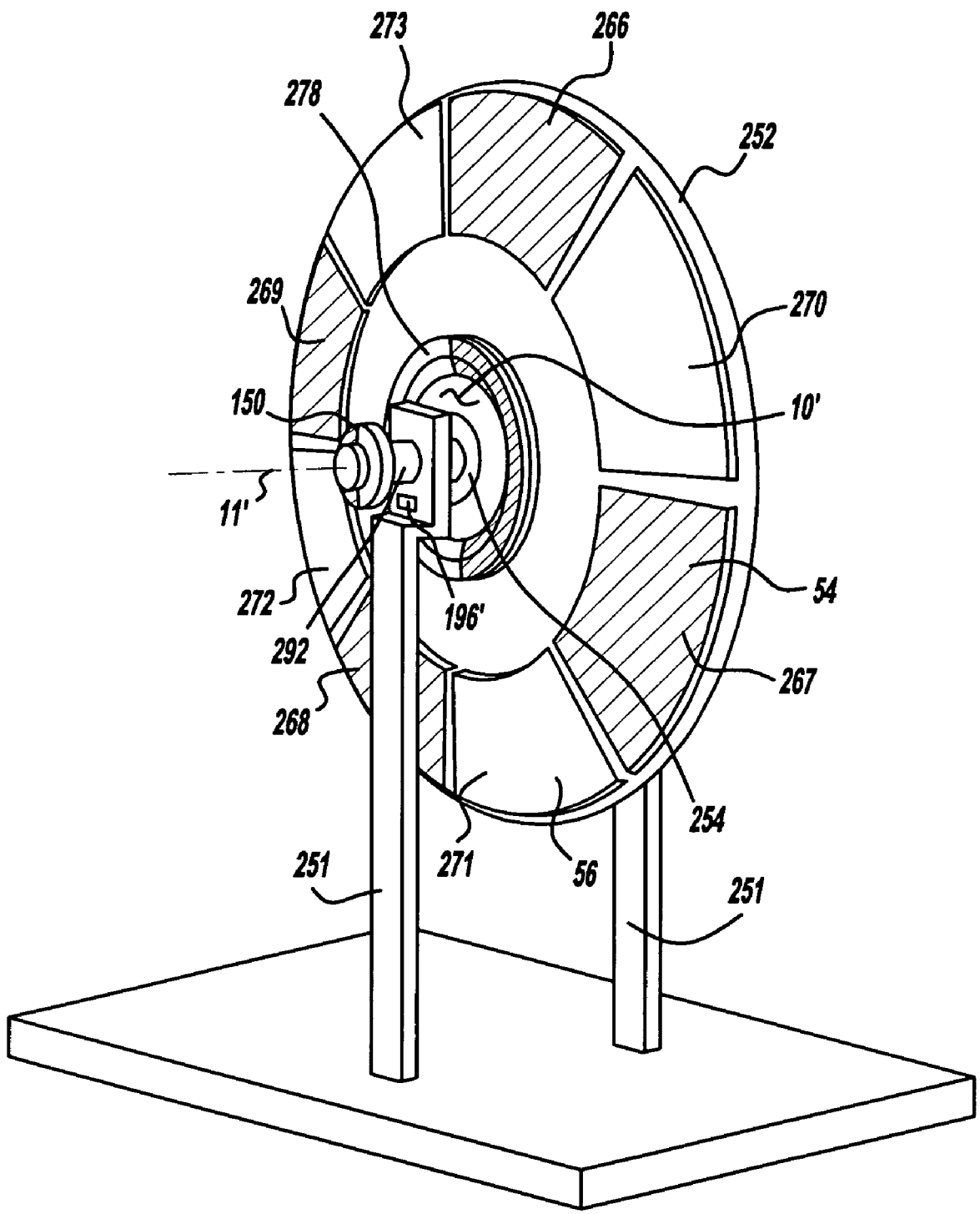
FIG. 21 is a perspective view of the generator magnets, reciprocating magnets and rotor magnets of the generator with drive motor of FIG. 20.

Referring now to FIG. 21, the rotor disc 252 supports a first set of four dipolar magnets 266-269, each magnet of the first set being spaced angularly about axis 11' and arranged such that the north pole 54 of each magnet faces axially away from the disc and each south pole 56 faces toward the disc. Located between each of the magnets 266-269 is a second set of magnet 270-273, whose south pole 56 faces axially away from disc 252 and whose north pole 54 faces toward the disc. This arrangement of the magnets on the rotor disc 252 produces magnetic fields, whose lines of flux project axially from the north poles of the magnets 266-269 of the first set and loop axially and angularly toward the south poles of the magnets 270-273 of the second set. When arranged as shown in FIG. 21, the rotor disc 252 has eight well-defined flux paths, each path extending between each of the adjacent magnets. Those flux paths rotate with the rotor disc 252 caused by the rotation of a rotating magnet 278 as described below.

The opposite side of rotor disc 252 may support magnets sets arranged as described with reference to FIG. 21. In this case, a second stator 220" is supported at the opposite side of the rotor disc 252 from the location of stator 220' and adjacent the axial face of the magnets located on that side of the disc.

Continuing to refer to FIG. 21, the rotor disc 252 includes the rotating magnet 278 comprising a pair of rotating semicircular, dipolar magnets 280, 286 secured to the disc and formed as a ring located radially inboard from the magnets of the first and second sets 266-273 and fixed around the rotor center support section 10'. To illustrate the design and spatial relationship, FIG. 22 breaks out from other components the reciprocate magnet 150 and rotating magnet 278 shown in FIG. 21. The first semicircular magnet 280 of the rotating magnet 278 has its north pole 54 facing away from disc 252 and its south pole 56 facing the disc. The second semicircular magnet 286 has its north pole 54 facing toward disc 252 and its south pole 56 facing away from the disc.

Figure 22:
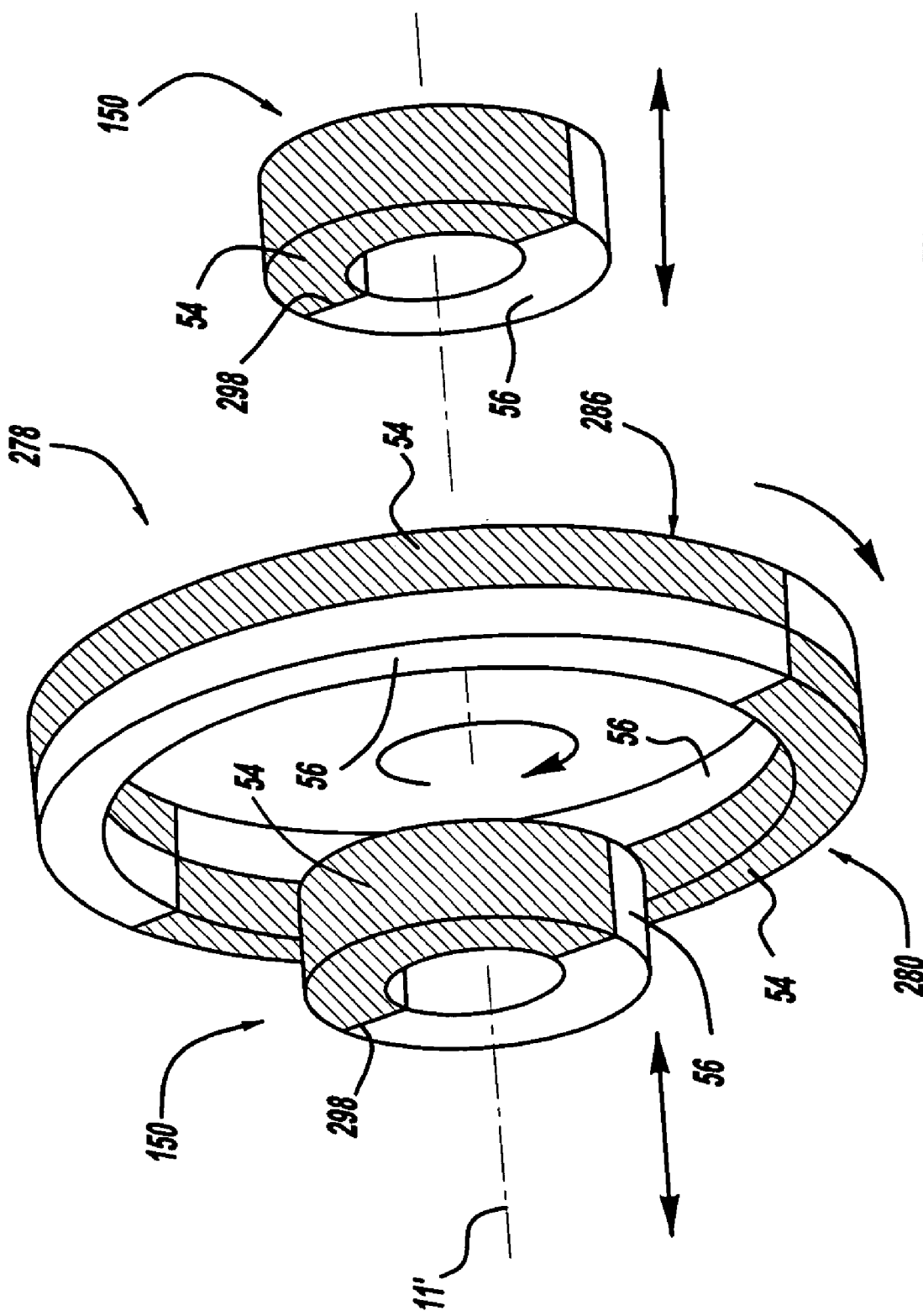
FIG. 22 is a perspective view of the reciprocating magnet and rotating magnet for the drive motor portion of the generator of FIGS. 20 and 21.

A reciprocating piston 292 of the permanent magnet drive motor for rotating the disc 252 is aligned with the axis 11' and passes through the rotor center support section 10' at the center of the generator disc 252 within the radius of the central opening of the annular rotating magnet 278. Piston 292 carries a pair of reciprocating magnets 150 with one on each side of the disc 252. FIG. 22 shows the configuration of the poles of the first reciprocating magnet 150 in relation to the rotating magnet 278. Specifically, the north pole 54 of reciprocating magnet 150 is semicircular and located on a first side of a diametric plane 298; the south pole 56 of reciprocating magnet 150 is semicircular and located on a second side of the diametric plane 298 opposite its north pole. Magnets 150 reciprocate axially relative to the magnet 278, thereby causing the rotating magnet 278 to sustain its rotation about the axis 11' much in the same way as the rotating magnets 42-49 on the rotor of the motor rotate about axis 11 as the reciprocating magnets 50-52 reciprocate toward and away from the rotating magnets 42-49, as discussed above with reference to FIGS. 2 and 3 for example.

FIG. 20 shows an annular cylindrical solenoid 74' aligned with axis 11' and located near a cylindrical toroidal magnet 90'. The solenoid 74' is energized using the same technique as described above for actuating the solenoid 74 shown in FIGS. 4 and 5. With reference thereto, rotor center support section 10' can be fitted with a positioning sensor comprising a cylinder 58 having contact plates 59-61 as described above. Further, as shown in FIGS. 4-8, the d.c. power supply 64 can have its terminals connected by contact fingers 66, 68, 70, 76, 80 to the contact plates 59-61 causing the polarity of the solenoid 74' to oscillate. As an alternative to the mechanical positioning embodiment, a photosensor 196' with sensor ring, like that described above with reference to FIG. 15, can be used to cooperatively determine the position of the rotor so as to alternate the polarity of the solenoid 74' with the rotor to correspond with the phase and cycle shown in FIG. 12. Rotation of the rotating magnet 278, and in turn the rotor disc 252 about the rotor center support section 10', is thereby sustained by cyclic axial movement of reciprocating magnets 150 toward and away from the rotating magnet 278.

In operation, as the generator rotor disc 252 of the generator 250' rotates, the eight magnetic fields on the rotor disc 252 rotate through the windings of the stator 220', 220" as the disc is driven in rotation by the permanent magnet drive motor. The windings of the stators 220', 220" may be interconnected to induce electric current having multiple phases or a single phase as the generator rotor disc 252 rotates past the windings of the stator. A rectifier circuit 236, connected to leads from the stator windings, converts alternating current to direct current and removes ripple from the current signal.

In accordance with the provisions of the patent statutes, the present invention has been described in what is considered to represent its preferred embodiment. However, it should be noted that the invention can be practiced otherwise than as specifically illustrated and described without departing from its spirit or scope. It is intended that all such modifications and alterations be included insofar as they come within the scope of the appended claims or the equivalents thereof.

The invention claimed is:

1. A generator comprising:
   a drive motor having a first pair and a second pair of permanent rotating magnets, each pair including a first rotating magnet and a second rotating magnet spaced radially from a motor axis such that each pair of rotating magnets rotates about the axis along a path having an innermost circumferential perimeter, a permanent reciprocating magnet supported for movement toward and away from the first and second pairs of rotating magnets, the reciprocating magnet having reference poles facing laterally from the motor axis and said reference poles being positioned axially between and radially within the innermost circumferential perimeters of the rotating magnets, and an actuator for moving the reciprocating magnet cyclically toward and away from the first pair and second pair of rotating magnets to simultaneously create repulsion and attraction forces continuously diagonal to the motor axis, to induce cyclical rotation of the first and second pairs of rotating magnets relative to the reciprocating magnet; and
   a first permanent generator magnet driveably connected to the drive motor and including a reference pole facing in a first direction;
   a second permanent generator magnet driveably connected to the drive motor including a pole of opposite polarity from the reference pole located near the reference pole and facing in the first direction, the first and second generator magnets producing a magnetic field whose flux extends between the reference pole of the first magnet and opposite pole of the second magnet; and
   a stator comprising an electrical conductor winding located adjacent the first and second generator magnets such that the magnetic field of the generator magnets repetitively intersects the winding as the drive motor operates.

2. The generator of claim 1, wherein the actuator further comprises:
   a permanent actuator magnet;
   a photosensor; and
   a solenoid supported for displacement adjacent a pole of the permanent actuator magnet.

3. The generator of claim 1, wherein the actuator further comprises:
   first and second bridge plates, mutually angularly aligned about the axis, extending over a first angular range about the axis;
   third and fourth bridge plates, offset axially from the first and second bridge plates, mutually angularly aligned about the axis, extending over a second angular range about the axis;
   an electric power supply including first and second terminals;
   a first contact connecting the first power supply terminal alternately to the first bridge plate and the third bridge plate as the rotor rotates;
   a second contact connecting the second power supply terminal alternately to the second bridge plate and the fourth bridge plate as the rotor rotates;
   a permanent magnet;
   a solenoid supported adjacent a pole of the permanent magnet, including first and second terminals;

a third contact connecting the first solenoid terminal alternately to the first and second power supply terminals through the first and fourth bridge plates and first contact as the rotor rotates;

a fourth contact alternately connecting and disconnecting the second power supply terminal and the second solenoid terminal as the rotor rotates; and a fifth contact alternately connecting and disconnecting the first power supply terminal and the second solenoid terminal as the rotor rotates.

4. The generator of claim 1, wherein:

the first generator magnet is included in a first set of generator magnets supported on a rotor and spaced mutually about a rotor axis, each generator magnet of the first set including a reference pole facing in a first direction;

the second generator magnet is included in a second set of generator magnets supported on the rotor and spaced mutually about the rotor axis, each generator magnet of the second set is located between two adjacent magnets of the first set and includes a pole of opposite polarity from the reference pole facing in the first direction, the generator magnets of the first and second sets producing multiple magnetic fields whose flux extends between the reference pole of one of the magnets of the first set and the opposite pole of one of the magnets of the second set; and the stator comprises multiple conductor windings located adjacent the first and second sets of generator magnets such that the magnetic fields repetitively intersect the windings as the rotor rotates.

5. The generator of claim 4, wherein the reciprocating magnet is one of a pair of reciprocating magnets, and each of the reciprocating magnets being spaced axially from the first pair of rotating magnets such that the first pair of rotating magnets is located axially between the reciprocating magnets.

6. The generator of claim 4, wherein the reference poles of the reciprocating magnet are substantially perpendicular to reference poles of said first and second pair of rotating magnets.

7. The generator of claim 5 further comprising:

a rectifier electrically connected to the windings for converting alternating current induced in each winding to direct current.

8. The generator of claim 6 further comprising:

a rectifier electrically connected to the windings for converting alternating current induced in each winding to direct current.

9. A generator comprising:

a rotor supported for rotation about an axis;

a first permanent generator magnet driveable by the rotor and including a reference pole facing in a first direction;

a second permanent generator magnet driveable by the rotor including a pole of opposite polarity from the reference pole located near the reference pole and facing in the first direction, the first and second magnets producing a magnetic field whose flux extends between the reference pole of the first magnet and opposite pole of the second magnet;

a stator comprising an electrical conductor winding located adjacent the first and second magnets such that the magnetic field repetitively intersects the winding as the rotor rotates; and a drive motor having:

a rotating permanent magnet being spaced from the rotor axis and supported on the rotor such that the rotating magnet rotates about the axis along a path having a radius;

first and second reciprocating permanent magnets supported for movement toward and away from the rotating magnet, the first and second reciprocating magnets having reference poles facing laterally from the rotor axis, and said reciprocating magnets are radially spaced from the rotor axis within the path radius of said rotating magnet to simultaneously create repulsion and attraction forces with the rotating magnet continuously diagonal to the rotor axis; and an actuator for cyclically moving the reciprocating magnets toward and away from the rotating magnet assembly thereby urging the rotor in rotation about the axis relative to the reciprocating magnets.

10. The generator of claim 9, wherein:

the rotating magnet comprises a first arcuate magnet having a reference pole facing in a first direction and a pole of opposite polarity facing opposite the first direction, a second arcuate magnet having a reference pole facing opposite the first direction and a pole of opposite polarity facing in the first direction, the first and second arcuate magnets being in mutual contact and forming a ring concentric with the axis, an axial length of the first and second arcuate magnets forming a circular cylinder aligned with the axis of the rotor.

11. The generator of claim 9, wherein the actuator further comprises:

first and second bridge plates, mutually angularly aligned about the axis, extending over a first angular range about the axis;

third and fourth bridge plates, offset axially from the first and second bridge plates, mutually angularly aligned about the axis, extending over a second angular range about the axis;

an electric power supply including first and second terminals;

a first contact connecting the first power supply terminal alternately to the first bridge plate and the third bridge plate as the rotor rotates;

a second contact connecting the second power supply terminal alternately to the second bridge plate and the fourth bridge plate as the rotor rotates;

a permanent actuator magnet;

a solenoid supported adjacent a pole of the permanent magnet, including first and second terminals;

a third contact connecting the first solenoid terminal alternately to the first and second power supply terminals through the first and fourth bridge plates and first contact as the rotor rotates;

a fourth contact alternately connecting and disconnecting the second power supply terminal and the second solenoid terminal as the rotor rotates; and a fifth contact alternately connecting and disconnecting the first power supply terminal and the second solenoid terminal as the rotor rotates.

12. The generator of claim 9, wherein the actuator further comprises:

a permanent actuator magnet;

an alternating current power source;

a solenoid supported for displacement adjacent a pole of the permanent actuator magnet, including first and second terminals electrically connected to the power source.

13. The generator of claim 9, wherein the rotating magnet is located axially between said first and second reciprocating magnets and the rotating magnet has reference poles facing perpendicular to the rotor axis.

14. The generator of claim 9 further comprises:
the first generator magnet is included in a first set of generator magnets supported on the rotor and spaced mutually about the axis, each generator magnet of the first set including a reference pole facing in a first direction;
the second generator magnet is included in a second set of generator magnets supported on the rotor and spaced mutually about the axis, each generator magnet of the second set is located between two adjacent magnets of the first set and includes a pole of opposite polarity from the reference pole facing in the first direction, the generator magnets of the first and second sets producing multiple magnetic fields whose flux extends between the reference pole of one of the magnets of the first set and the opposite pole of one of the magnets of the second set; and
the stator comprises multiple conductor windings located adjacent the first and second sets of generator magnets such that the magnetic fields repetitively intersect the windings as the rotor rotates.

15. The generator of claim 14, further comprising:
a rectifier electrically connected to the windings for converting alternating current induced in each winding to direct current.

* * * * *